US012253608B2

(12) United States Patent
Yoshida

(10) Patent No.: US 12,253,608 B2
(45) Date of Patent: Mar. 18, 2025

(54) MEASUREMENT VEHICLE, AND BASE STATION

(71) Applicant: Mitsubishi Electric Corporation, Tokyo (JP)

(72) Inventor: Mitsunobu Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 310 days.

(21) Appl. No.: 17/770,297

(22) PCT Filed: Sep. 16, 2020

(86) PCT No.: PCT/JP2020/035143
§ 371 (c)(1),
(2) Date: Apr. 20, 2022

(87) PCT Pub. No.: WO2021/124629
PCT Pub. Date: Jun. 24, 2021

(65) Prior Publication Data
US 2022/0397421 A1    Dec. 15, 2022

(30) Foreign Application Priority Data
Dec. 17, 2019    (JP) .................. 2019-227576

(51) Int. Cl.
*G01S 19/01*    (2010.01)
*G01S 17/89*    (2020.01)

(52) U.S. Cl.
CPC ............. *G01S 19/01* (2013.01); *G01S 17/89* (2013.01)

(58) Field of Classification Search
None
See application file for complete search history.

(56) References Cited

U.S. PATENT DOCUMENTS

| 6,526,352 B1 * | 2/2003 | Breed .................. G01S 19/071 |
| | | 701/470 |
| 8,712,686 B2 * | 4/2014 | Bandyopadhyay .... G01C 17/38 |
| | | 701/445 |

(Continued)

FOREIGN PATENT DOCUMENTS

| EP | 3299763 A1 | 3/2018 |
| JP | 2006-11726 A | 1/2006 |

(Continued)

OTHER PUBLICATIONS

Japanese Office Action issued Sep. 27, 2022 in corresponding Japanese Patent Application No. 2021-565333 (with machine-generated English translation), 11 pages.

(Continued)

Primary Examiner — Chikaodili E Anyikire
(74) Attorney, Agent, or Firm — XSENSUS LLP

(57) ABSTRACT

A measurement vehicle (101) acquires measurement environment data indicating a measurement environment from a measurement system and transmits the acquired measurement environment data to a base station (104). The measurement vehicle (101) receives movement measurement instruction data indicating an instruction on the movement measurement from the base station (104). The measurement vehicle (101) controls the measurement system in accordance with the instruction indicated by the received movement measurement instruction data.

6 Claims, 19 Drawing Sheets

(56) References Cited

U.S. PATENT DOCUMENTS

| | | | |
|---|---|---|---|
| 10,983,201 B2* | 4/2021 | Pimentel | B64C 39/024 |
| 11,501,104 B2* | 11/2022 | Ung | G06T 7/20 |
| 11,920,948 B2* | 3/2024 | Kitahara | G01C 21/3815 |
| 2019/0179320 A1* | 6/2019 | Pacala | B60Q 9/008 |
| 2020/0021751 A1* | 1/2020 | Otaka | H04N 5/272 |
| 2021/0099307 A1* | 4/2021 | Rolf | H04L 9/0643 |

FOREIGN PATENT DOCUMENTS

| | | |
|---|---|---|
| JP | 2015-007572 A | 1/2015 |
| JP | 2019-153081 A | 9/2019 |
| WO | 2016/185637 A | 11/2016 |

OTHER PUBLICATIONS

International Search Report mailed on Dec. 1, 2020, received for PCT Application PCT/JP2020/035143, Filed on Sep. 16, 2020, 14 pages including English Translation.

* cited by examiner

MEASUREMENT VEHICLE, AND BASE STATION

CROSS-REFERENCE TO RELATED APPLICATIONS

The present application is based on PCT filing PCT/JP2020/035143, filed Sep. 16, 2020, which claims priority to Japanese Application No. 2019-227576, filed Dec. 17, 2019, the entire contents of each are incorporated herein by reference.

TECHNICAL FIELD

The present invention relates to a technique for remotely managing movement measurement to be performed by each of one or more measurement vehicles.

BACKGROUND ART

Movement measurement based on a mobile mapping system (MMS) is known.

In MMS-based movement measurement, a dedicated vehicle (measurement vehicle) in which a measurement system including various types of measurement instruments is installed is prepared.

It is usually the case in MMS-based movement measurement that a driver and an operator as a pair get in a measurement vehicle.

However, to curb measurement costs, it is desired that a driver alone performs movement measurement with no operator in a car.

If movement measurement is performed by a driver alone, operating a measurement system while driving is prohibited for traffic safety. That is, the driver can operate the measurement system only when the driver is not driving the measurement vehicle.

Patent Literature 1 discloses a system which displays, in real time, a point cloud image obtained by movement measurement.

CITATION LIST

Patent Literature

Patent Literature 1: WO 2016/185637

SUMMARY OF INVENTION

Technical Problem

The system of Patent Literature 1 allows control of display of a point cloud image during driving of a measurement vehicle. However, it is impossible to operate a measurement system while driving the measurement vehicle.

The present invention has as its object to allow operation of a measurement system while driving a measurement vehicle even in a case without an operator in the measurement vehicle.

Solution to Problem

A measurement vehicle of the present invention is installed in a measurement system for movement measurement.

The measurement vehicle includes:
a data notification unit to acquire measurement environment data indicating a measurement environment from the measurement system and to transmit the acquired measurement environment data to a base station;
a remote instruction acceptance unit to receive movement measurement instruction data indicating an instruction on the movement measurement from the base station; and
a vehicle-mounted control unit to control the measurement system in accordance with the instruction indicated by the received movement measurement instruction data.

Advantageous Effects of Invention

The present invention allows remote operation of the measurement system. It is thus possible to operate the measurement system while driving the measurement vehicle even in a case without an operator in the measurement vehicle.

DESCRIPTION OF EMBODIMENTS

Figure 1:
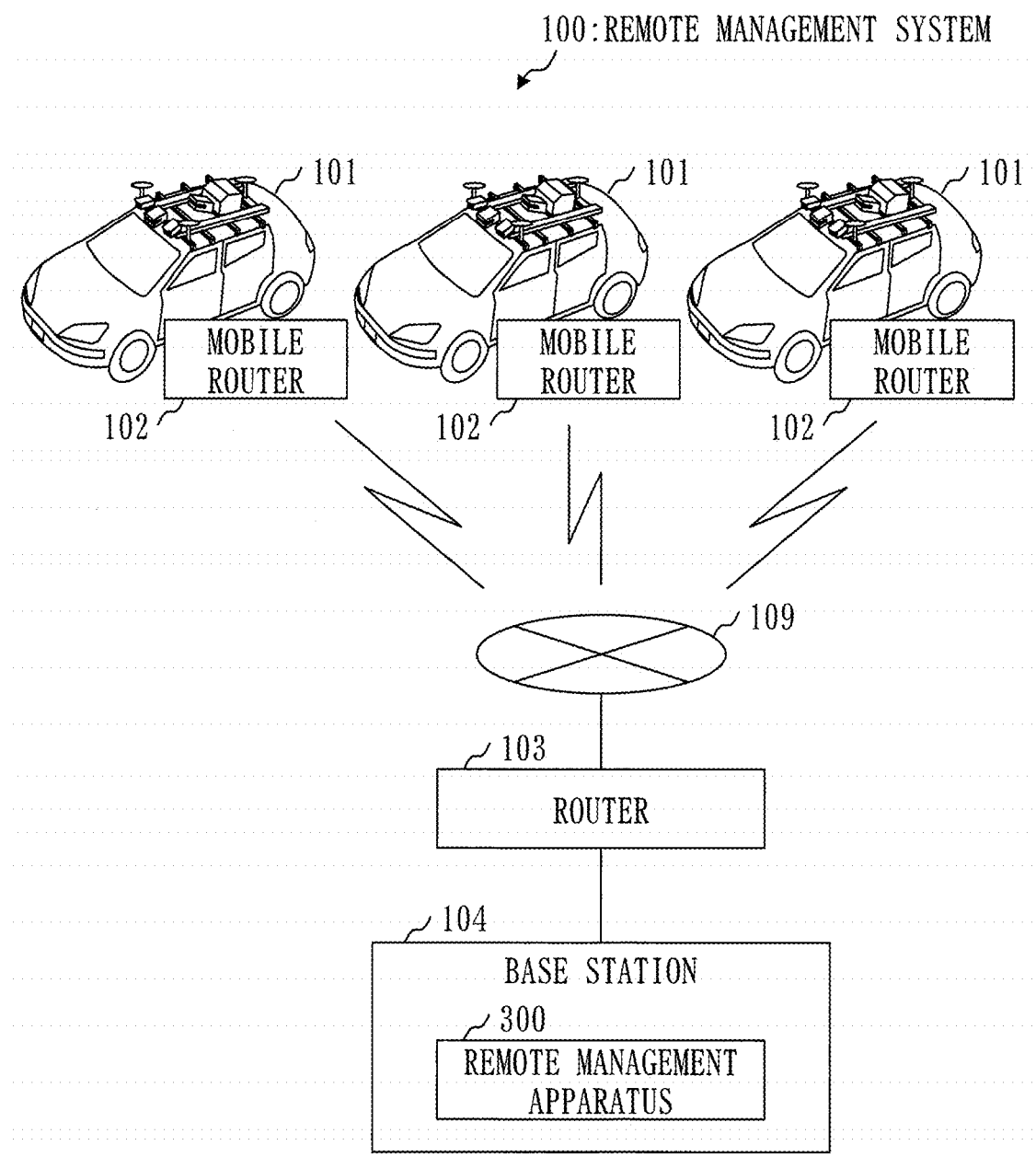
FIG. 1 is a diagram of a configuration of a remote management system 100 according to Embodiment 1.

The same or corresponding elements in the embodiments and drawings are denoted by the same reference numerals. A description of an element denoted by the same reference numeral as a described element will be appropriately omitted or simplified. An arrow in the drawings mainly indicates the flow of data or the flow of processing.

Embodiment 1

A remote management system 100 will be described on the basis of FIGS. 1 to 11.
*Description of Configuration*
A configuration of the remote management system 100 will be described on the basis of FIG. 1.

The remote management system 100 includes one or more measurement vehicles 101, a router 103, and a base station 104.

Each measurement vehicle 101 includes a mobile router 102.

Each measurement vehicle 101 communicates with the base station 104 via a network 109.

A specific example of the network 109 is the Internet.

The router 103 is an apparatus which relays data to be communicated between each measurement vehicle 101 and the base station 104.

The measurement vehicle 101 is a vehicle which performs movement measurement. A specific example of the measurement vehicle 101 is a vehicle which is used in a mobile mapping system (MMS). A specific example of the vehicle is an automobile.

In movement measurement, each of satellite positioning and surroundings measurement is performed during running of the measurement vehicle 101.

Satellite positioning is positioning which uses a satellite positioning system. A position of the measurement vehicle 101 is obtained by satellite positioning. The satellite positioning system is also called a global navigation satellite system (GNSS). A specific example of the satellite positioning system is a global positioning system (GPS).

Surroundings measurement is three-dimensional measurement on a feature which is present in surroundings. A three-dimensional position and a three-dimensional shape of a feature present in surroundings of the measurement vehicle 101 are obtained by surroundings measurement.

The base station 104 is a facility for remotely managing satellite positioning by each measurement vehicle 101 and surroundings measurement by each measurement vehicle 101.

The base station 104 includes a remote management apparatus 300.

The remote management apparatus 300 remotely manages satellite positioning by each measurement vehicle 101 and surroundings measurement by each measurement vehicle 101.

Figure 2:
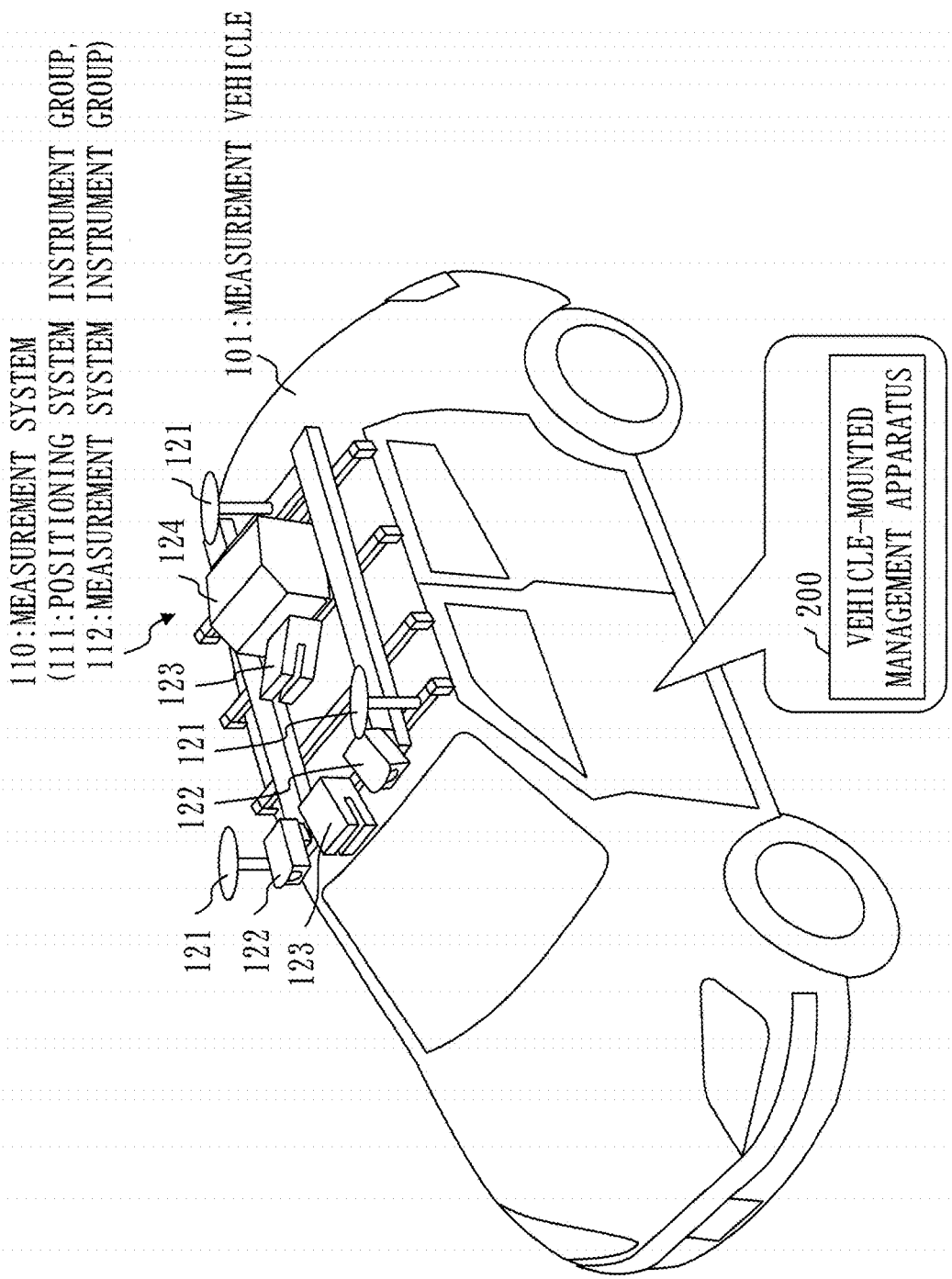
FIG. 2 is a diagram of a configuration of a measurement vehicle 101 according to Embodiment 1.

A configuration of the measurement vehicle 101 will be described on the basis of FIG. 2.

The measurement vehicle 101 includes a measurement system 110.

The measurement system 110 has a positioning system instrument group 111 and a measurement system instrument group 112.

The positioning system instrument group 111 is a group of measurement instruments for satellite positioning. The group of measurement instruments is one or more measurement instruments. For example, the positioning system instrument group 111 is composed of an antenna 121 and an IMU 124.

The measurement system instrument group 112 is a group of measurement instruments for surroundings measurement. Assume that the positioning system instrument group 111 is not included in the measurement system instrument group 112. For example, the measurement system instrument group 112 is composed of two cameras 122 and two laser scanners 123.

The antenna 121 is an antenna for satellite positioning and receives a positioning signal transmitted from a positioning satellite.

The camera 122 shoots the surroundings of the measurement vehicle 101.

The laser scanner 123 measures a distance and a direction to each point in the surroundings of the measurement vehicle 101.

The IMU 124 is an inertial measurement device and measures an angular velocity of the measurement vehicle 101 and an acceleration of the measurement vehicle 101.

The measurement vehicle 101 includes a vehicle-mounted management apparatus 200.

The vehicle-mounted management apparatus 200 is connected to the measurement system 110 by a wired signal cable or a communication line 500 for wireless communication or the like and manages the measurement system 110.

Figure 3:
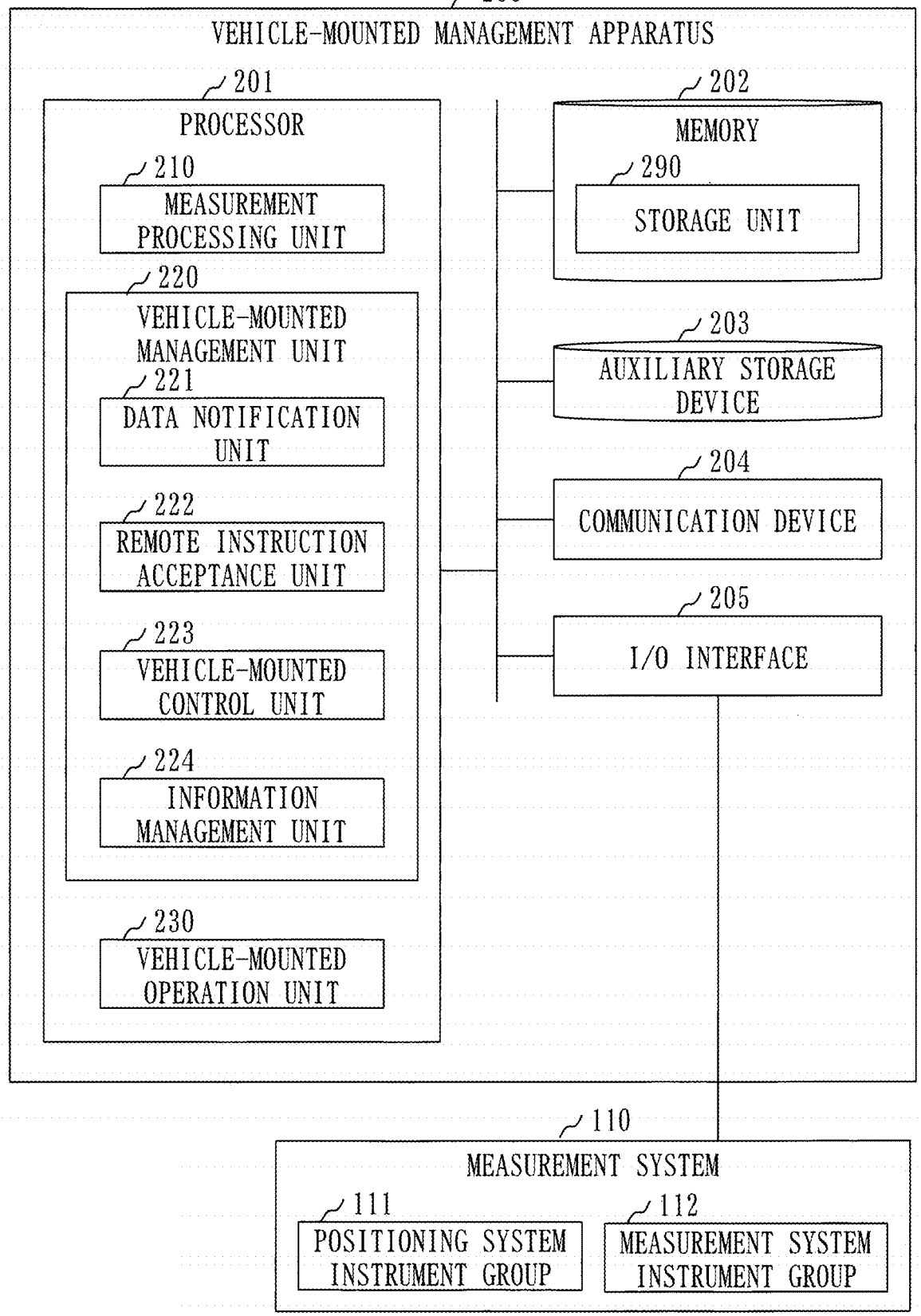
FIG. 3 is a diagram of a configuration of a vehicle-mounted management apparatus 200 according to Embodiment 1.

A configuration of the vehicle-mounted management apparatus 200 will be described on the basis of FIG. 3.

The vehicle-mounted management apparatus 200 is a computer including pieces of hardware, such as a processor 201, a memory 202, an auxiliary storage device 203, a communication device 204, and an I/O interface 205. These pieces of hardware are connected to each other via signal lines.

The processor 201 is an IC which performs arithmetic processing and controls the other pieces of hardware. For example, the processor 201 is a CPU, a DSP, or a GPU.

IC stands for Integrated Circuit.
CPU stands for Central Processing Unit.
DSP stands for Digital Signal Processor.
GPU stands for Graphics Processing Unit.

The memory 202 is a volatile or nonvolatile storage device. The memory 202 is also called a main storage device or a main memory. For example, the memory 202 is a RAM. Data stored in the memory 202 is saved in the auxiliary storage device 203 as needed.

RAM stands for Random Access Memory.

The auxiliary storage device 203 is a nonvolatile storage device. For example, the auxiliary storage device 203 is a ROM, an HDD, or a flash memory. Data stored in the auxiliary storage device 203 is loaded into the memory 202 as needed.

ROM stands for Read Only Memory.
HDD stands for Hard Disk Drive.

The communication device 204 is a receiver and a transmitter. For example, the communication device 204 is a communication chip or a NIC.

NIC stands for Network Interface Card.

The I/O interface 205 is a port to which an input device, an output device, and the measurement system 110 are to be connected. For example, the I/O interface 205 is a USB terminal, the input device is a keyboard and a mouse, and the output device is a display and a car navigation system.

USB stands for Universal Serial Bus.

The vehicle-mounted management apparatus 200 includes elements, such as a measurement processing unit 210, a vehicle-mounted management unit 220, and a vehicle-mounted operation unit 230. The vehicle-mounted management unit 220 includes elements, such as a data notification unit 221, a remote instruction acceptance unit 222, a vehicle-mounted control unit 223, and an information management unit 224. These elements are implemented by software.

A vehicle-mounted management program for causing a computer to function as the measurement processing unit 210, the vehicle-mounted management unit 220, and the vehicle-mounted operation unit 230 is stored in the auxiliary storage device 203. The vehicle-mounted management program is loaded into the memory 202 and is executed by the processor 201.

An OS is also stored in the auxiliary storage device 203. At least a part of the OS is loaded into the memory 202 and is executed by the processor 201.

The processor 201 executes the vehicle-mounted management program while executing the OS.

OS stands for Operating System.

I/O data of the vehicle-mounted management program is stored in a storage unit 290.

The memory 202 functions as the storage unit 290. Note that storage devices, such as the auxiliary storage device 203, a register in the processor 201, and a cache memory in the processor 201, may function as the storage unit 290 instead of the memory 202 or together with the memory 202.

The vehicle-mounted management apparatus 200 may include a plurality of processors which substitute for the processor 201. The plurality of processors share functions of the processor 201.

The vehicle-mounted management program can be computer-readably recorded on (stored in) a nonvolatile recording medium, such as an optical disc or a flash memory.

Figure 4:
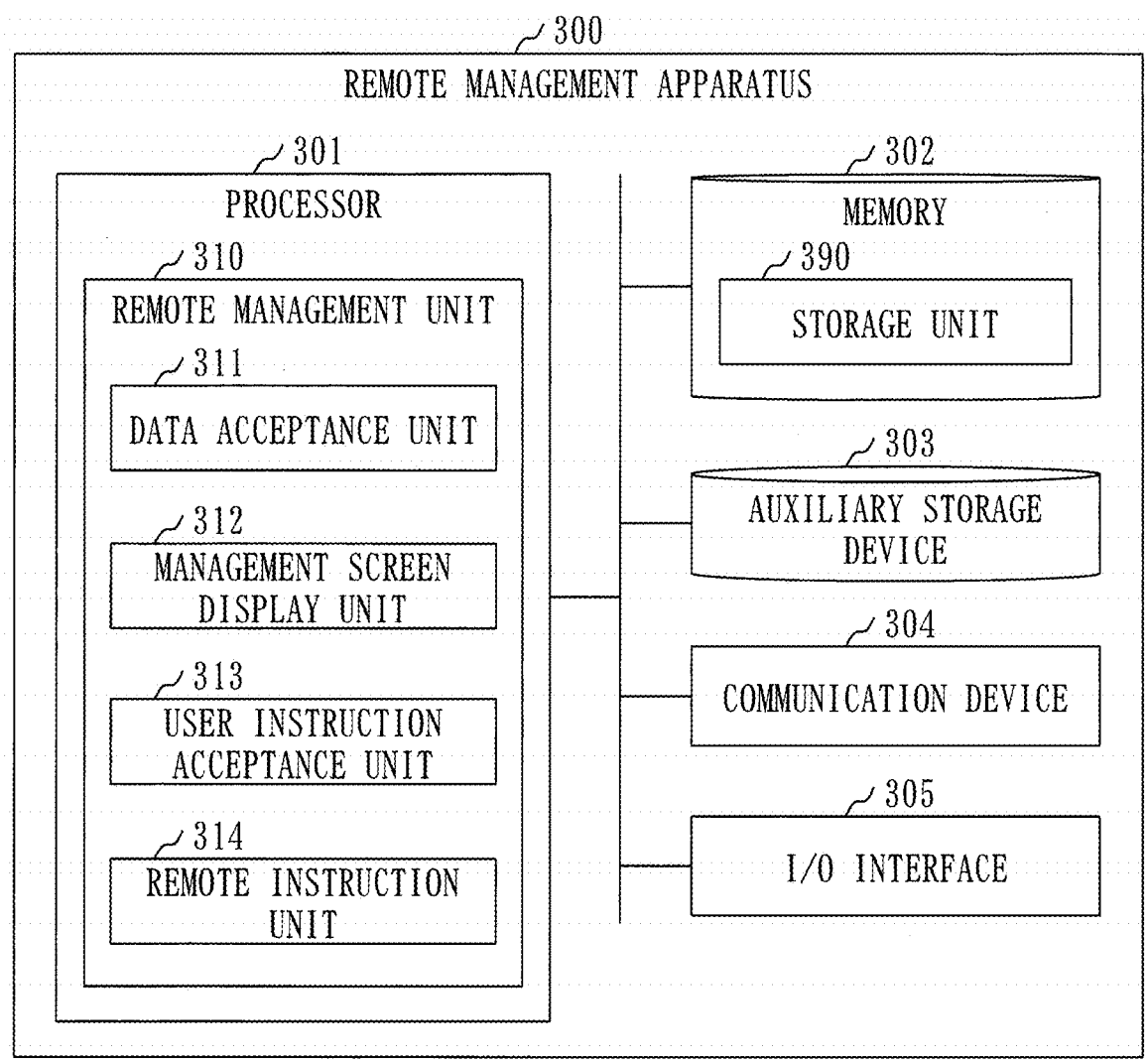
FIG. 4 is a diagram of a configuration of a remote management apparatus 300 according to Embodiment 1.

A configuration of the remote management apparatus 300 will be described on the basis of FIG. 4.

The remote management apparatus 300 is a computer including pieces of hardware, such as a processor 301, a memory 302, an auxiliary storage device 303, a communication device 304, and an I/O interface 305. These pieces of hardware are connected to each other via signal lines.

The processor 301 is an IC which performs arithmetic processing and controls the other pieces of hardware. For example, the processor 301 is a CPU, a DSP, or a GPU.

The memory 302 is a volatile or nonvolatile storage device. The memory 302 is also called a main storage device or a main memory. For example, the memory 302 is a RAM. Data stored in the memory 302 is saved in the auxiliary storage device 303 as needed.

The auxiliary storage device 303 is a nonvolatile storage device. For example, the auxiliary storage device 303 is a ROM, an HDD, or a flash memory. Data stored in the auxiliary storage device 303 is loaded into the memory 302 as needed.

The communication device 304 is a receiver and a transmitter. For example, the communication device 304 is a communication chip or a NIC.

The I/O interface 305 is a port to which an input device and an output device are to be connected. For example, the I/O interface 305 is a USB terminal, the input device is a keyboard and a mouse, and the output device is a display.

The remote management apparatus 300 includes a remote management unit 310. The remote management unit 310 includes elements, such as a data acceptance unit 311, a management screen display unit 312, a user instruction acceptance unit 313, and a remote instruction unit 314. These elements are implemented by software.

A remote management program for causing a computer to function as the remote management unit 310 is stored in the auxiliary storage device 303. The remote management program is loaded into the memory 302 and is executed by the processor 301.

An OS is also stored in the auxiliary storage device 303. At least a part of the OS is loaded into the memory 302 and is executed by the processor 301.

The processor 301 executes the remote management program while executing the OS.

I/O data of the remote management program is stored in a storage unit 390.

The memory 302 functions as the storage unit 390. Note that storage devices, such as the auxiliary storage device 303, a register in the processor 301, and a cache memory in the processor 301, may function as the storage unit 390 instead of the memory 302 or together with the memory 302.

The remote management apparatus 300 may include a plurality of processors which substitute for the processor 301. The plurality of processors share functions of the processor 301.

The remote management program can be computer-readably recorded on (stored in) a nonvolatile recording medium, such as an optical disc or a flash memory.

*Description of Operation*

A procedure of operation of the remote management system 100 is equivalent to a remote management method. A procedure of operation of the vehicle-mounted management apparatus 200 is equivalent to a procedure of a process by the vehicle-mounted management program. A procedure of operation of the remote management apparatus 300 is equivalent to a procedure of a process by the remote management program.

Operation of the measurement processing unit 210 of the vehicle-mounted management apparatus 200 will be described.

The measurement processing unit 210 processes measurement data at each time.

The measurement data is data which is obtained by each measurement instrument of the measurement system 110.

Measurement data obtained by the antenna 121 is referred to as "observation data". The observation data indicates a result of receiving a positioning signal, content of the positioning signal, and the like.

Measurement data obtained by the camera 122 is referred to as "image data". The image data represents an image (surroundings image) in which the surroundings of the measurement vehicle 101 appear.

Measurement data obtained by the laser scanner 123 is referred to as "laser point cloud data". The laser point cloud data indicates a distance and a direction from the laser scanner 123 to each point in the surroundings of the measurement vehicle 101.

Measurement data obtained by the IMU 124 is referred to as "inertial data". The inertial data indicates the angular velocity of the measurement vehicle 101 and the acceleration of the measurement vehicle 101.

For example, the measurement processing unit 210 processes pieces of measurement data in the following manner.

The measurement processing unit 210 uses three pieces of observation data which are obtained from three antennas 121 to perform satellite positioning. With this, the position of the measurement vehicle 101 is calculated.

The measurement processing unit 210 uses inertial data at each time to perform inertial navigation. With this, the position of the measurement vehicle 101 is calculated.

The measurement processing unit 210 combines satellite positioning and inertial navigation to calculate the position of the measurement vehicle 101.

The measurement processing unit 210 generates vehicle position data. The vehicle position data indicates the position of the measurement vehicle 101. The position of the measurement vehicle 101 is identified by a three-dimensional coordinate value.

The measurement processing unit 210 uses laser point cloud data and vehicle position data to calculate a position of each point. The measurement processing unit 210 generates three-dimensional point cloud data. The three-dimensional point cloud data is data indicating respective positions of a plurality of points. The position of each point is identified by means of a three-dimensional coordinate value.

The measurement processing unit 210 performs image processing on image data. With this, image information including features appearing in a surroundings image is obtained. The measurement processing unit 210 may detect a feature object by image processing on the image data. For example, the image information is information on a traffic sign, a traffic marking, a white line, and the like. For example, a traffic sign, a traffic marking, a white line, or the like is detected as a feature object.

The measurement processing unit 210 belongs to the measurement system 110. That is, the measurement processing unit 210 is one of elements constituting the measurement system 110.

Data obtained by the measurement processing unit 210 is referred to as "measurement processing data".

The measurement processing unit 210 saves measurement data at each time and measurement processing data at each time in the storage unit 290.

The operation of the vehicle-mounted management apparatus 200 in the remote management method will be described on the basis of FIG. 5.

In step S101, the data notification unit 221 transmits various types of notification data to the remote management apparatus 300.

The notification data is data which is transmitted to the remote management apparatus 300 by the data notification unit 221.

Specifically, the data notification unit 221 acquires measurement environment data from the measurement system 110 and transmits the acquired measurement environment data to the remote management apparatus 300.

The measurement environment data is data indicating a measurement environment.

The measurement environment data includes at least any one of vehicle position data, instrument status data, and positioning condition data.

The vehicle position data indicates the position of the measurement vehicle 101.

The vehicle position data is acquired from the measurement processing unit 210.

The instrument status data indicates a status of each of one or more measurement instruments included in the measurement system 110.

The status of each measurement instrument is classified as in-operation, out-of-operation, in-error-state, or the like. If the status of each measurement instrument is in-error-state, the instrument status data includes error-related data, such as error information or an error log.

Instrument status data of each measurement instrument is acquired from the measurement instrument.

The positioning condition data indicates a condition of satellite positioning. Specifically, the positioning condition data indicates a Fix state, an error prediction value, and the like.

The Fix state is information which specifies whether satellite positioning is possible. For example, the Fix state is judged on the basis of the number of visible satellites. A visible satellite is a positioning satellite which is a transmission source of a positioning signal arriving at each antenna 121. Although each antenna 121 can receive a positioning signal which is transmitted from a visible satellite, the antenna 121 cannot receive a positioning signal which is transmitted from a positioning satellite (shielded satellite) other than a visible satellite. Unless at least four visible satellites are present, satellite positioning cannot be performed.

The error prediction value is a value representing accuracy of satellite positioning.

The positioning condition data is acquired from the antenna 121 or the measurement processing unit 210.

The data notification unit 221 may transmit movement measurement status data to the remote management apparatus 300.

The movement measurement status data includes at least either one of satellite positioning status data and surroundings measurement status data.

The satellite positioning status data indicates whether satellite positioning is in progress. If satellite positioning is in progress, the satellite positioning status data indicates a positioning ID and an elapsed time period. ID stands for an identifier. The positioning ID identifies satellite positioning in progress. The elapsed time period is a time period elapsed from the start of satellite positioning in progress.

The surroundings measurement status data indicates whether surroundings measurement is in progress. If surroundings measurement is in progress, the surroundings measurement status data indicates a scene number and an elapsed time period. The scene number identifies surroundings measurement in progress. The elapsed time period is a time period elapsed from the start of surroundings measurement in progress.

The movement measurement status data is managed by the information management unit 224.

The data notification unit 221 may transmit free space data to the remote management apparatus 300.

The free space data indicates the size of a space area (free space) in a storage area allocated for saving of measurement data and measurement processing data. The space area is a storage area where neither measurement data nor measurement processing data is recorded.

The free space data is managed by the information management unit 224.

The data notification unit 221 may transmit image data to the remote management apparatus 300.

The image data is obtained by each camera 122.

Measurement environment data, movement measurement status data, free space data, and image data are pieces of real-time data. Real-time data is data which is obtained in real time.

The data notification unit 221 may transmit at least either one of measurement history data and saved data to the remote management apparatus 300.

The measurement history data indicates a history of surroundings measurement. Specifically, the measurement history data indicates, for example, a scene number and a measurement time frame of each surroundings measurement in the past.

The saved data is past measurement data and past measurement processing data.

The measurement history data and the saved data are pieces of past data. Past data is data obtained in the past.

Notification data is transmitted to the remote management apparatus 300 at a timing as described below.

The data notification unit 221 periodically transmits notification data to the remote management apparatus 300.

The data notification unit 221 transmits notification data to the remote management apparatus 300 at a predetermined timing.

The data notification unit 221 transmits notification data to the remote management apparatus 300 in accordance with a request from the remote management apparatus 300.

In step S102, the remote instruction acceptance unit 222 receives various types of remote instruction data which are transmitted from the remote management apparatus 300.

The remote instruction data is data which is transmitted from the remote management apparatus 300 and is received by the remote instruction acceptance unit 222.

Specifically, the remote instruction acceptance unit 222 receives movement measurement instruction data which is transmitted from the remote management apparatus 300.

The movement measurement instruction data indicates an instruction on movement measurement.

For example, the movement measurement instruction data is positioning start instruction data or positioning end instruction data.

The positioning start instruction data indicates an instruction for a start of satellite positioning.

The positioning end instruction data indicates an instruction for an end of satellite positioning.

For example, the movement measurement instruction data is measurement start instruction data or measurement end instruction data.

The measurement start instruction data indicates an instruction for a start of surroundings measurement.

The measurement end instruction data indicates an instruction for an end of surroundings measurement.

The remote instruction acceptance unit 222 may receive setting instruction data which is transmitted from the remote management apparatus 300.

The setting instruction data indicates an instruction for setting of each measurement instrument.

The remote instruction acceptance unit 222 may receive manward instruction data which is transmitted from the remote management apparatus 300.

The manward instruction data indicates an instruction to a driver of the measurement vehicle 101.

The remote instruction acceptance unit 222 may receive deletion instruction data which is transmitted from the remote management apparatus 300.

The deletion instruction data indicates an instruction for deletion of saved data.

The remote instruction acceptance unit 222 may receive maintenance instruction data which is transmitted from the remote management apparatus 300.

The maintenance instruction data indicates an instruction for maintenance of the vehicle-mounted management apparatus 200.

For example, the maintenance instruction data indicates an instruction for update of various types of software which are used in the vehicle-mounted management apparatus 200 or an instruction for running of check disk on the various types of storage devices that are used in the vehicle-mounted management apparatus 200.

In step S103, the vehicle-mounted control unit 223 controls the measurement system 110 or the vehicle-mounted management apparatus 200 in accordance with the received remote instruction data.

If positioning start instruction data is received, the vehicle-mounted control unit 223 inputs an order for a start of satellite positioning to the positioning system instrument group 111. The positioning system instrument group 111 starts satellite positioning in accordance with the order.

If positioning end instruction data is received, the vehicle-mounted control unit 223 inputs an order for an end of satellite positioning to the positioning system instrument group 111. The positioning system instrument group 111 ends satellite positioning in accordance with the order.

If measurement start instruction data is received, the vehicle-mounted control unit 223 inputs an order for a start of surroundings measurement to the measurement system instrument group 112. The measurement system instrument group 112 starts surroundings measurement in accordance with the order.

If measurement end instruction data is received, the vehicle-mounted control unit 223 inputs an order for an end of surroundings measurement to the measurement system instrument group 112. The measurement system instrument group 112 ends surroundings measurement in accordance with the order.

If setting instruction data is received, the vehicle-mounted control unit 223 makes settings of every type, an instruction for which is given, for each measurement instrument.

If manward instruction data is received, the vehicle-mounted control unit 223 outputs, in characters or via voice, an instruction to the driver.

For example, the instruction to the driver is output using a car navigation system.

If deletion instruction data is received, the vehicle-mounted control unit 223 deletes designated saved data from the storage unit 290.

If maintenance instruction data is received, the vehicle-mounted control unit 223 performs designated maintenance for the vehicle-mounted management apparatus 200.

For example, the vehicle-mounted control unit 223 updates the various types of software used in the vehicle-mounted management apparatus 200. Alternatively, the vehicle-mounted control unit 223 runs check disk on the various types of storage devices used in the vehicle-mounted management apparatus 200.

Figure 6:
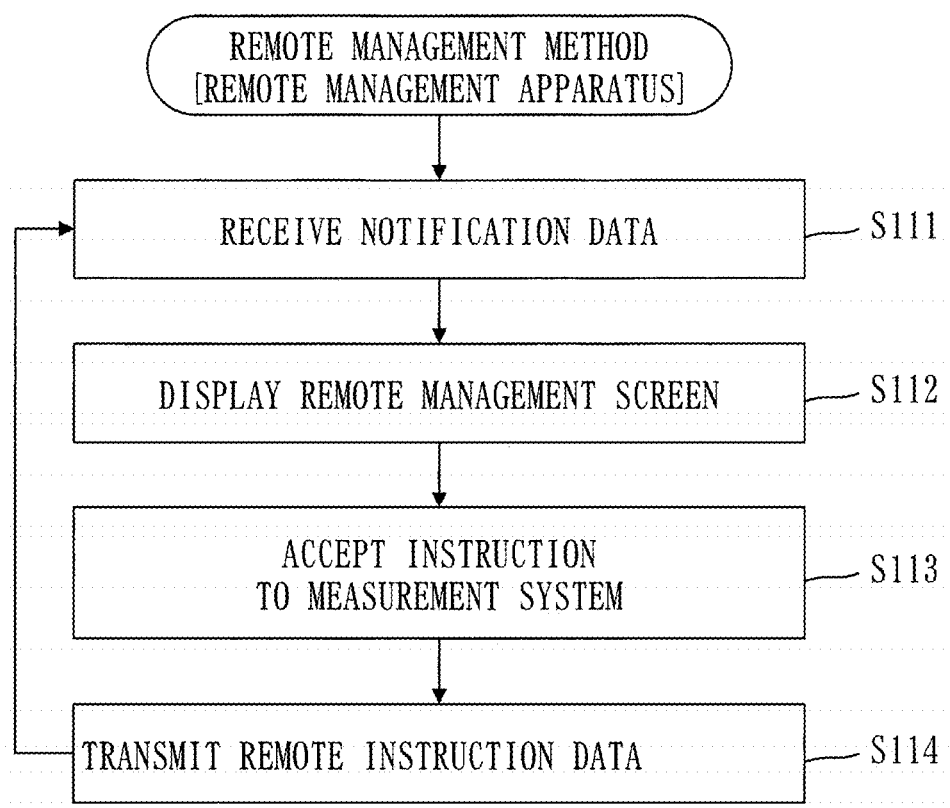
FIG. 6 is a flowchart of a remote management method by the remote management apparatus 300 according to Embodiment 1.

The operation of the remote management apparatus 300 in the remote management method will be described on the basis of FIG. 6.

In step S111, the data acceptance unit 311 receives various types of notification data which are transmitted from the vehicle-mounted management apparatus 200.

Figure 5:
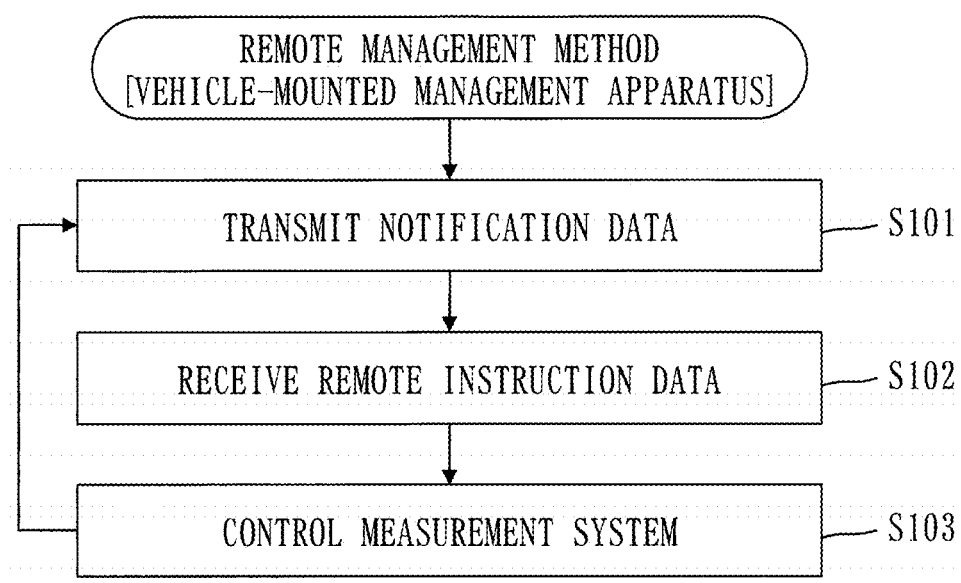
FIG. 5 is a flowchart of a remote management method by the vehicle-mounted management apparatus 200 according to Embodiment 1.

Types of notification data are as described in step S101 (see FIG. 5).

Notification data is received at a timing as described below.

The data acceptance unit 311 receives notification data which is periodically transmitted.

The data acceptance unit 311 receives notification data which is transmitted at a predetermined timing.

A manager inputs an instruction for request of notification data to the remote management apparatus 300. The data notification unit 221 accepts the input instruction and requests notification data from the vehicle-mounted management apparatus 200. The data notification unit 221 receives notification data which is transmitted as a response from the vehicle-mounted management apparatus 200.

The manager is a user which uses the vehicle-mounted management apparatus 200 functioning as a management terminal.

In step S112, the management screen display unit 312 generates a remote management screen indicating the notification data and displays the generated remote management screen.

The remote management screen is displayed on a display which is connected to the remote management apparatus 300.

The remote management screen has a user interface for indicating notification data and a user interface for accepting an instruction to the measurement system 110 or the vehicle-mounted management apparatus 200.

Figure 7:
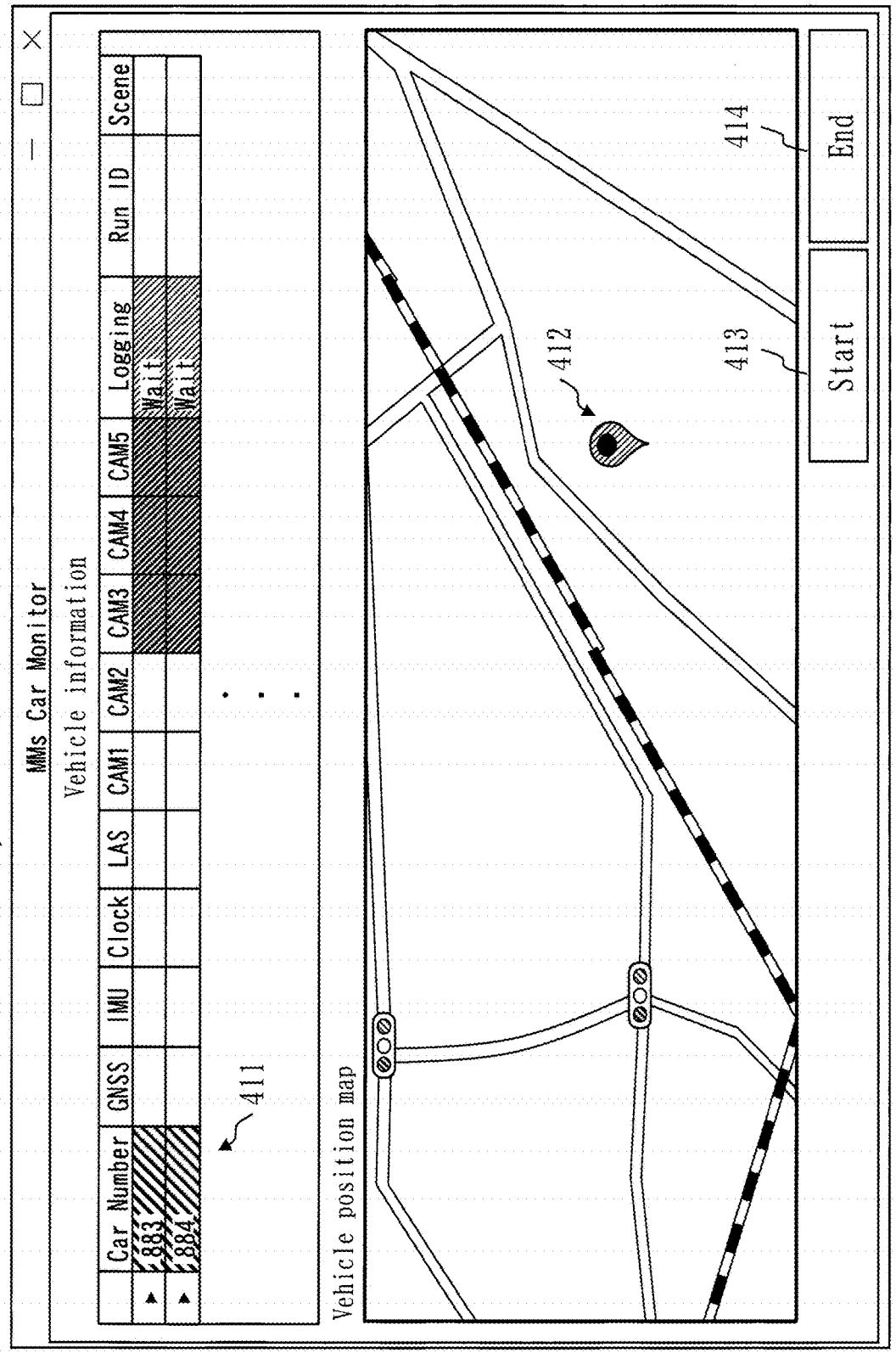
FIG. 7 is a view showing a remote management screen 410 according to Embodiment 1.

A remote management screen 410 is shown in FIG. 7. The remote management screen 410 is an example of the remote management screen.

The remote management screen 410 has fields, such as "Vehicle Information" and "Vehicle Position Map".

The "Vehicle Information" indicates a vehicle information row 411 for each measurement vehicle 101. That is, the "Vehicle Information" indicates one or more vehicle information rows 411 corresponding to one or more measurement vehicles 101.

The vehicle information row 411 indicates various types of information on the measurement vehicle 101. That is, one vehicle information row 411 indicates various types of information on one measurement vehicle 101.

Specifically, the vehicle information row 411 has cells for a "vehicle identifier", an "instrument status" for each measurement instrument, a "log acquisition status", a "run identifier", and a "scene identifier".

The "vehicle identifier" indicates an identifier of the measurement vehicle 101. A cell corresponding to "Car Number" is equivalent to a "vehicle identifier".

The "instrument status" indicates a status of the measurement instrument. The status of the measurement instrument is distinguished by a color, a pattern, a character, or a combination thereof. A cell corresponding to "GNSS", "IMU", "LAS", or "CAMx" is equivalent to an "instrument status". The letter "x" is an integer.

The "log acquisition status" indicates a status of acquisition of a measurement log. The measurement log is a log related to surroundings measurement. The status of acquisition of the measurement log is distinguished by a color, a pattern, a character, or a combination thereof. A cell corresponding to "Logging" is equivalent to a "log acquisition status".

The "run identifier" indicates an identifier for each run for surroundings measurement. A cell corresponding to "Run ID" is equivalent to a "run identifier".

The "scene identifier" indicates an identifier for each surroundings measurement. A cell corresponding to "Scene" is equivalent to a "scene identifier".

The "Vehicle Position Map" indicates a map and a vehicle position mark 412.

The vehicle position mark 412 is a mark indicating the position of the measurement vehicle 101.

If the manager clicks and selects any vehicle information row 411 of the vehicle information, the management screen display unit 312 displays a vehicle position map for the measurement vehicle 101 corresponding to the selected vehicle information row 411 on the remote management screen 410.

That is, at a base station, it is possible to operate a plurality of measurement vehicles 101 at one time using the remote management screen 410.

The remote management screen 410 further has a start button 413 and an end button 414.

The start button 413 is a button for giving an instruction to start at least either one of satellite positioning and surroundings measurement.

The end button 414 is a button for giving an instruction to end at least either one of satellite positioning and surroundings measurement.

Figure 8:
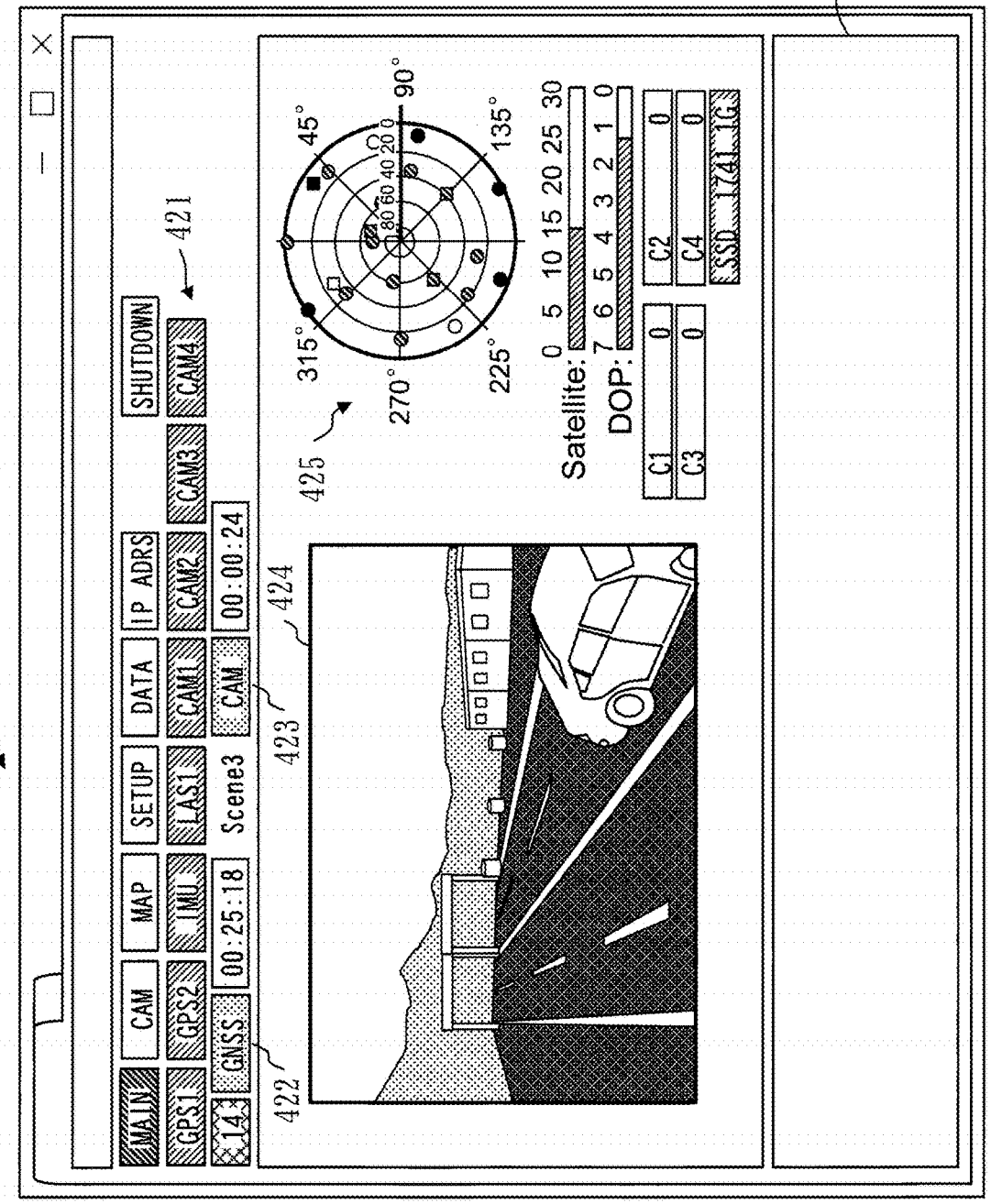
FIG. 8 is a view showing a remote management screen 420 according to Embodiment 1.

A remote management screen 420 is shown in FIG. 8. The remote management screen 420 is an example of the remote management screen.

The remote management screen 420 has a status field 421 for each measurement instrument, a positioning operation button 422, a measurement operation button 423, an image field 424, a positioning environment field 425, and a log field 426.

The status field 421 indicates a status of a measurement instrument. The status of the measurement instrument is distinguished by a color, a pattern, a character, or a combination thereof.

The positioning operation button 422 is a button for giving an instruction to start satellite positioning or end satellite positioning.

The measurement operation button 423 is a button for giving an instruction to start surroundings measurement or end surroundings measurement.

The image field 424 indicates an image which is obtained by the cameras 122.

The positioning environment field 425 indicates various types of information on a positioning environment. Specifically, the positioning environment field 425 indicates a sky plot, a visible satellite count, and a positioning accuracy.

The sky plot indicates arrangement of positioning satellites above the measurement vehicle 101. In the sky plot, visible satellites and shielded satellites are each distinguished by a color, a pattern, or a shape.

The visible satellite count is the number of visible satellites.

The positioning accuracy is represented by, for example, DOP. DOP stands for Dilution Of Precision.

The log field 426 indicates a measurement log.

Figure 9:
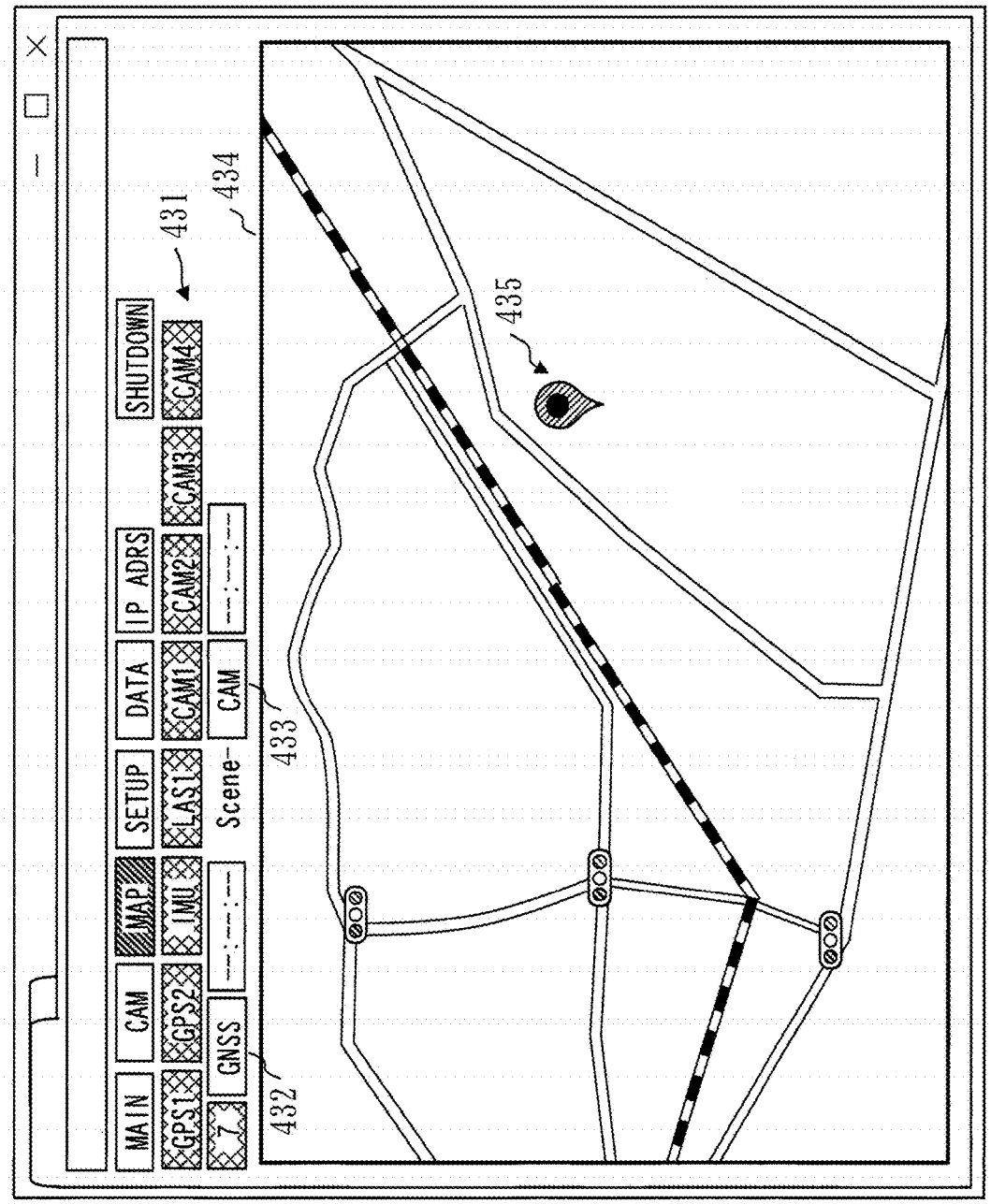
FIG. 9 is a view showing a remote management screen 430 according to Embodiment 1.

A remote management screen 430 is shown in FIG. 9. The remote management screen 430 is an example of the remote management screen.

The remote management screen 430 has a status field 431 for each measurement instrument, a positioning operation button 432, a measurement operation button 433, and a map field 434.

The status field 431 indicates a status of a measurement instrument. The status of the measurement instrument is distinguished by a color, a pattern, a character, or a combination thereof.

The positioning operation button 432 is a button forgiving an instruction to start satellite positioning or end satellite positioning.

The measurement operation button 433 is a button for giving an instruction to start surroundings measurement or end surroundings measurement.

The map field 434 indicates a map and a vehicle position mark 435.

The vehicle position mark 435 is a mark indicating the position of the measurement vehicle 101.

Figure 10:
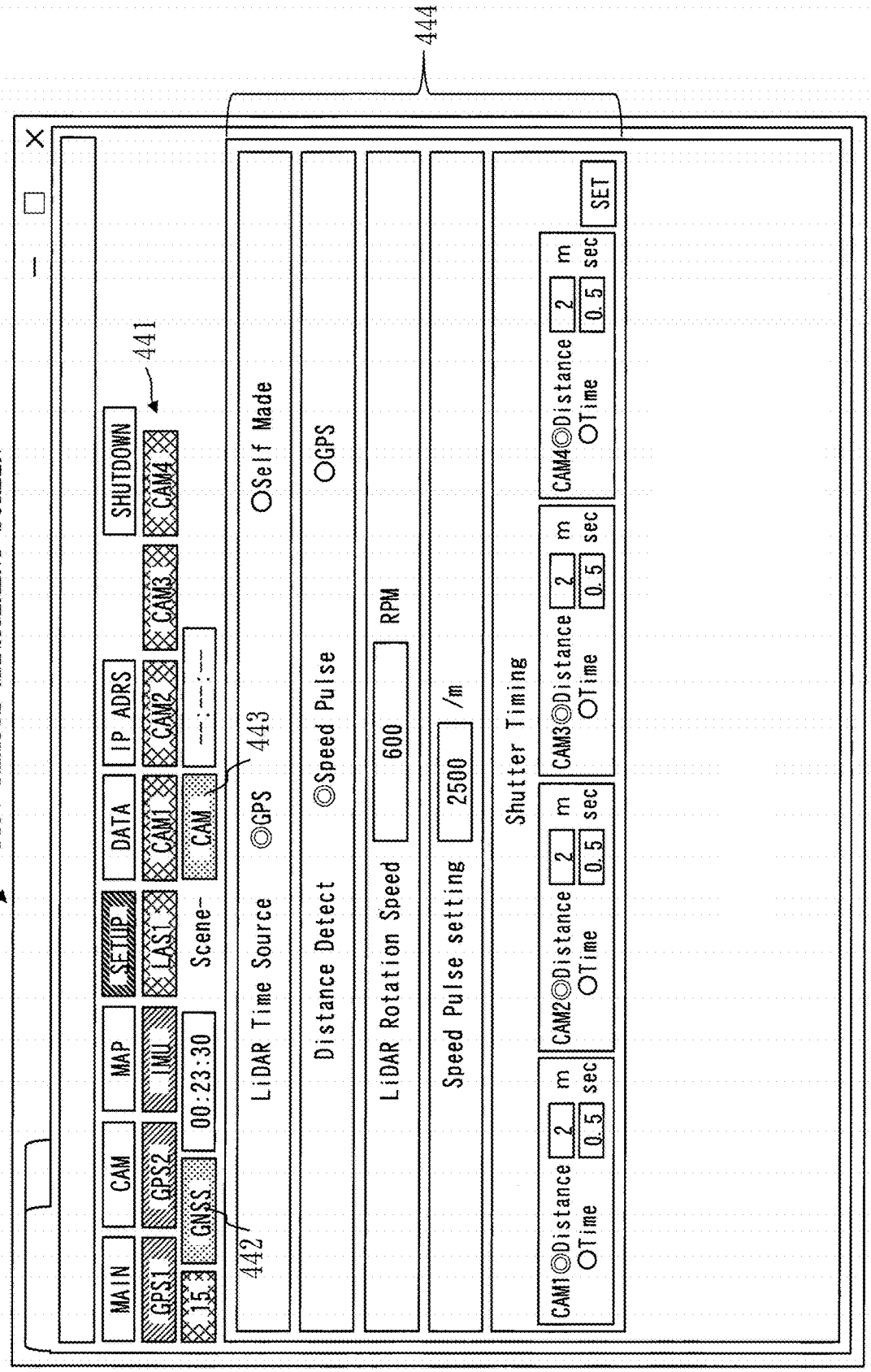
FIG. 10 is a view showing a remote management screen 440 according to Embodiment 1.

A remote management screen 440 is shown in FIG. 10. The remote management screen 440 is an example of the remote management screen.

The remote management screen 440 has a status field 441 for each measurement instrument, a positioning operation button 442, a measurement operation button 443, and a settings field 444.

The status field 441 indicates a status of a measurement instrument. The status of the measurement instrument is distinguished by a color, a pattern, a character, or a combination thereof.

The positioning operation button 442 is a button for giving an instruction to start satellite positioning or end satellite positioning.

The measurement operation button 443 is a button for giving an instruction to start surroundings measurement or end surroundings measurement.

The settings field 444 is a user interface for designating settings on each measurement instrument.

Referring back to FIG. 6, a description will be continued from step S113.

In step S113, the manager inputs, to the remote management apparatus 300, various types of instructions to the measurement system 110 or the vehicle-mounted management apparatus 200, using a user interface included in the remote management screen.

The user instruction acceptance unit 313 accepts the various types of instructions to the measurement system 110 or the vehicle-mounted management apparatus 200 via the user interface included in the remote management screen.

In step S114, the remote instruction unit 314 generates remote instruction data indicating the accepted instructions and transmits the generated remote instruction data to the vehicle-mounted management apparatus 200.

Types of remote instruction data are as described in step S102 (FIG. 5).

The remote instruction unit 314 may determine an instruction to the measurement system 110 or the vehicle-mounted management apparatus 200 on the basis of the notification data, generate remote instruction data indicating the determined instruction, and transmit the generated remote instruction data to the vehicle-mounted management apparatus 200.

For example, the remote instruction unit 314 refers to positioning condition data, thereby judging whether satellite positioning is possible. If the remote instruction unit 314 judges that satellite positioning is possible, the remote instruction unit 314 generates positioning start instruction data and transmits the generated positioning start instruction data to the vehicle-mounted management apparatus 200.

*Supplement to Embodiment 1*

Operation of the vehicle-mounted operation unit 230 of the vehicle-mounted management apparatus 200 will be described.

The vehicle-mounted operation unit 230 is an element for causing the vehicle-mounted management apparatus 200 to function as an operation terminal.

The measurement system 110 is remotely operated by the remote management apparatus 300. Note that the driver of the measurement vehicle 101 may operate the measurement system 110 using the operation terminal. If an operator gets in the measurement vehicle 101 as a passenger, the operator may also operate the measurement system 110 using the operation terminal.

The driver and the operator are users which use the vehicle-mounted management apparatus 200 functioning as the operation terminal.

The vehicle-mounted operation unit 230 generates a vehicle-mounted management screen for managing movement measurement and displays the generated vehicle-mounted management screen.

The vehicle-mounted management screen is displayed on a display which is connected to the vehicle-mounted management apparatus 200.

The vehicle-mounted management screen has a user interface for indicating various types of information and a user interface for accepting an instruction to the measurement system 110.

The driver or the operator inputs, to the vehicle-mounted management apparatus 200, various types of instructions to the measurement system 110 using the user interface included in the vehicle-mounted management screen.

The vehicle-mounted operation unit 230 accepts various types of instructions to the measurement system 110 via the user interface included in the vehicle-mounted management screen. The vehicle-mounted operation unit 230 controls the measurement system 110 in accordance with the accepted instructions.

Figure 11:
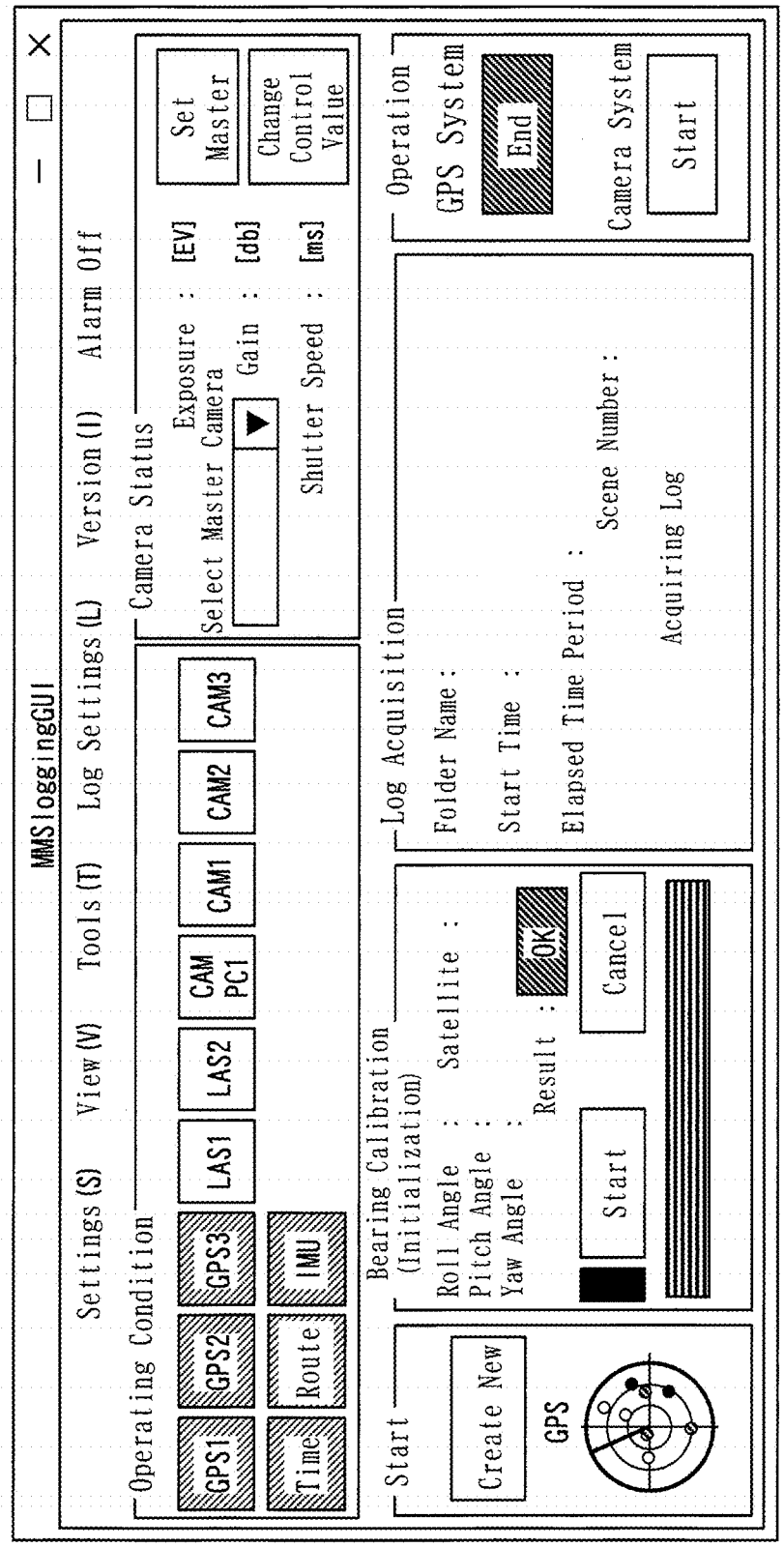
FIG. 11 is a view showing a vehicle-mounted management screen 490 according to Embodiment 1.

A vehicle-mounted management screen 490 is shown in FIG. 11. The vehicle-mounted management screen 490 is an example of the vehicle-mounted management screen.

The vehicle-mounted management screen 490 has fields, such as "Operating Condition", "Camera Status", "Log Acquisition", and "Operation".

The "Operating Condition" has a status field for each measurement instrument and indicates a status of each measurement instrument. The status of each measurement instrument is distinguished by a color, a pattern, or the like of a status field.

The "Camera Status" indicates settings on each camera 122. There are types of settings, such as exposure, gain, and shutter speed, on the camera 122. The "Camera Status" has a settings change button. A rectangle labeled "Change Control Value" is the settings change button. If the settings change button is pressed, the vehicle-mounted operation unit 230 displays a settings change screen for the camera 122. The settings change screen for the camera 122 is a screen for changing settings on the camera 122 and has a user interface. The vehicle-mounted operation unit 230 accepts a control value via the user interface included in the settings change screen and sets the accepted control value in the camera 122.

The "Log Acquisition" indicates a status of acquisition of a measurement log. The status of acquisition of the measurement log is identified by a folder name, a start time, an elapsed time period, a scene number, an acquisition status, and the like. The folder name is a name of a folder where the measurement log is to be saved. The start time is a time of a start of recording of the measurement log. The elapsed time period is a time period elapsed from the start of recording of the measurement log. The scene number identifies surroundings measurement in progress. The acquisition status indicates whether the measurement log is being acquired.

The "Operation" has respective buttons for operating the positioning system instrument group 111 and the measurement system instrument group 112. The button for operating the positioning system instrument group 111 is referred to as a positioning operation button. A rectangle labeled "GPS System" is the positioning operation button. If the positioning operation button is pressed, the vehicle-mounted operation unit 230 inputs an order for a start of satellite positioning or an order for an end of satellite positioning to the positioning system instrument group 111. The positioning system instrument group 111 starts or ends satellite positioning in accordance with the order. The button for operating the measurement system instrument group 112 is referred to as a measurement operation button. A rectangle labeled "Camera System" is the measurement operation button. If the measurement operation button is pressed, the vehicle-mounted operation unit 230 inputs an order for a start of surroundings measurement or an order for an end of surroundings measurement to the measurement system instrument group 112. The measurement system instrument group 112 starts or ends surroundings measurement in accordance with the order.

The data notification unit 221 of the vehicle-mounted management apparatus 200 may be implemented by a dedicated application or may be implemented by a Web server function.

If the data notification unit 221 is implemented by a dedicated application, a remote management screen is displayed by a dedicated application for screen display in the remote management apparatus 300. In this case, in the mobile router 102 (see FIG. 1) of the measurement vehicle 101, a dynamic IP address can be used. In the router 103 on the base station 104 side, a fixed IP address is used. IP stands for Internet Protocol. In communication from the measurement vehicle 101 to the base station 104, a packet having a fixed IP address and a predetermined port number set therein is transmitted.

If the data notification unit 221 is implemented by a Web server function, a remote management screen is displayed by a Web browser in the remote management apparatus 300. In this case, a fixed IP address is also used in the mobile router 102 of the measurement vehicle 101.

\*\*\*Advantageous Effects of Embodiment 1\*\*\*

Embodiment 1 allows remote operation of the measurement system 110. Thus, it is possible to operate the measurement system 110 while driving the measurement vehicle 101 even in a case without an operator in the measurement vehicle 101.

It is also possible for one operator to operate a plurality of measurement systems 110 installed in a plurality of measurement vehicles 101. For this reason, manpower cost can be significantly cut.

A driver need not operate the measurement system 110. For this reason, various automobiles, such as a truck, a bus, a taxi, a delivery car, or a private vehicle, can be used as the measurement vehicles 101 by attaching the measurement system 110 to the various automobiles.

Embodiment 2

A form in which a vehicle-mounted management apparatus 200 automatically makes a start of surroundings measurement and an end of surroundings measurement will be described mainly with a focus on differences from Embodiment 1 on the basis of FIGS. 12 to 17.

\*\*\*Description of Configuration\*\*\*

A configuration of a remote management system 100 is the same as the configuration (see FIG. 1) in Embodiment 1.

A configuration of a measurement vehicle 101 is the same as the configuration (see FIG. 2) in Embodiment 1.

Figure 12:
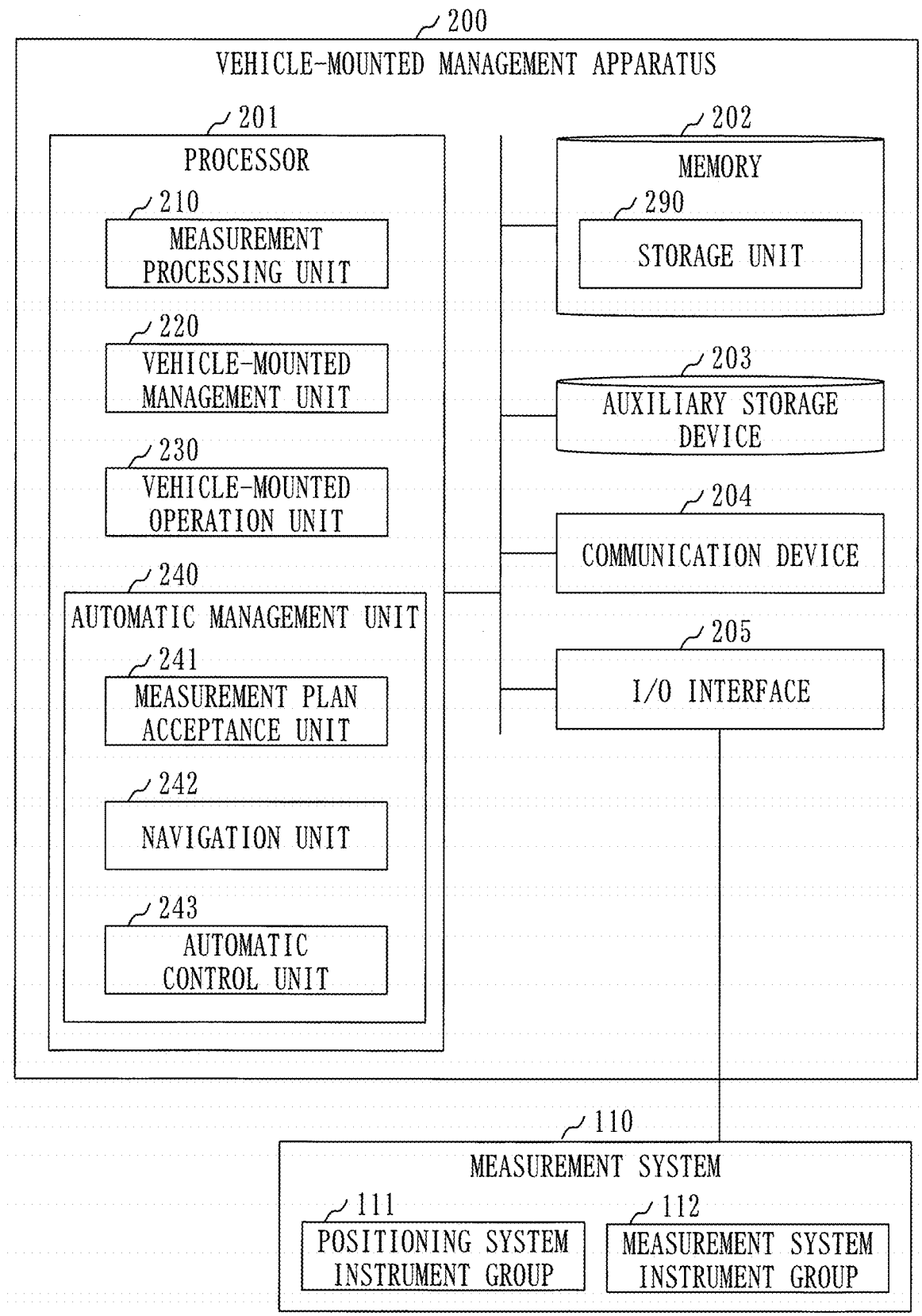
FIG. 12 is a diagram of a configuration of a vehicle-mounted management apparatus 200 according to Embodiment 2.

A configuration of the vehicle-mounted management apparatus 200 will be described on the basis of FIG. 12.

The vehicle-mounted management apparatus 200 further includes an automatic management unit 240. The automatic management unit 240 includes a measurement plan acceptance unit 241, a navigation unit 242, and an automatic control unit 243. These elements are implemented by software.

A vehicle-mounted management program causes a computer to further function as the automatic management unit 240.

Figure 13:
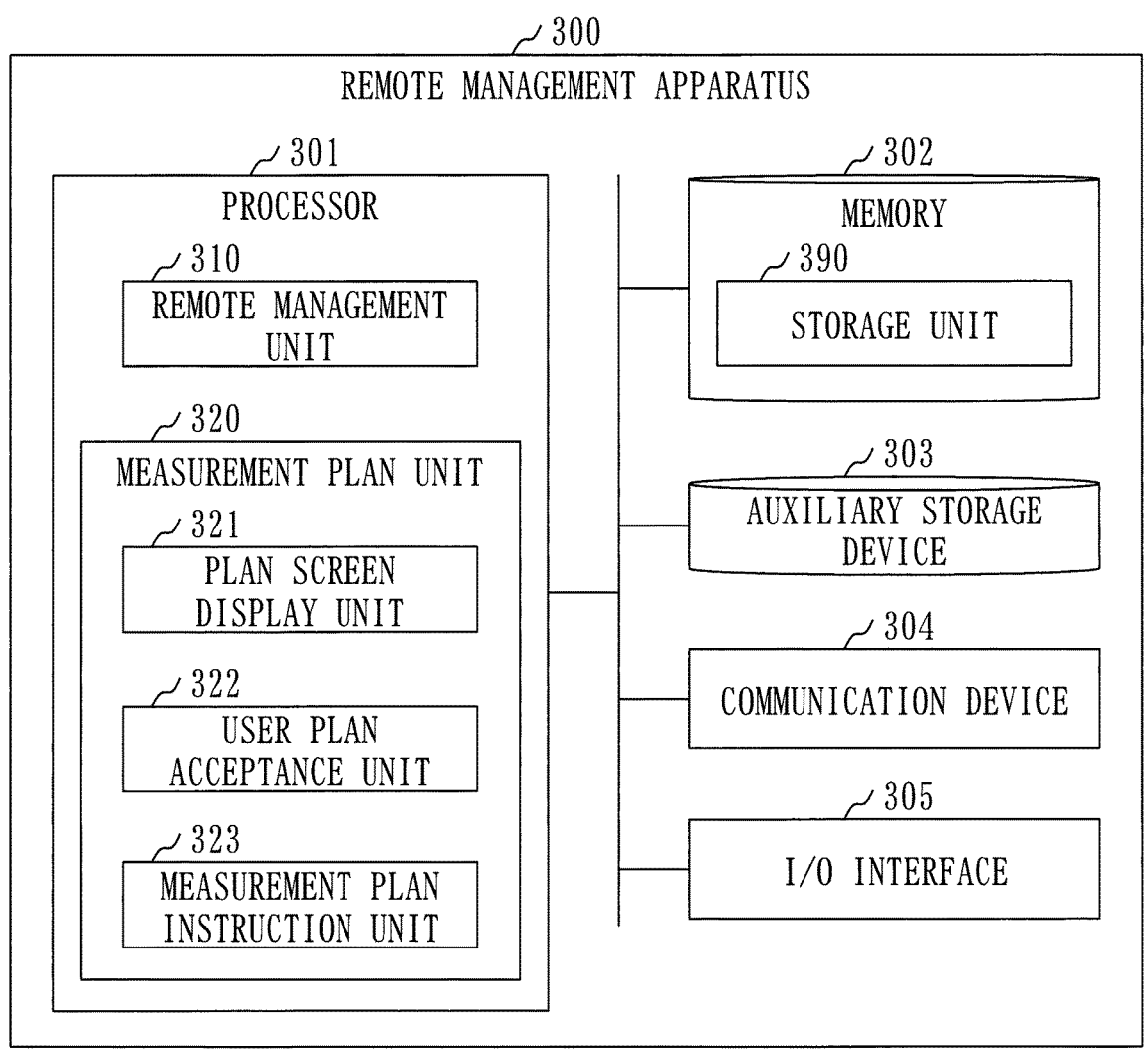
FIG. 13 is a diagram of a configuration of a remote management apparatus 300 according to Embodiment 2.

A configuration of a remote management apparatus 300 will be described on the basis of FIG. 13.

The remote management apparatus 300 further includes a measurement plan unit 320. The measurement plan unit 320 includes a plan screen display unit 321, a user plan acceptance unit 322, and a measurement plan instruction unit 323. These elements are implemented by software.

A remote management program causes a computer to further function as the measurement plan unit 320.

\*\*\*Description of Operation\*\*\*

Figure 14:
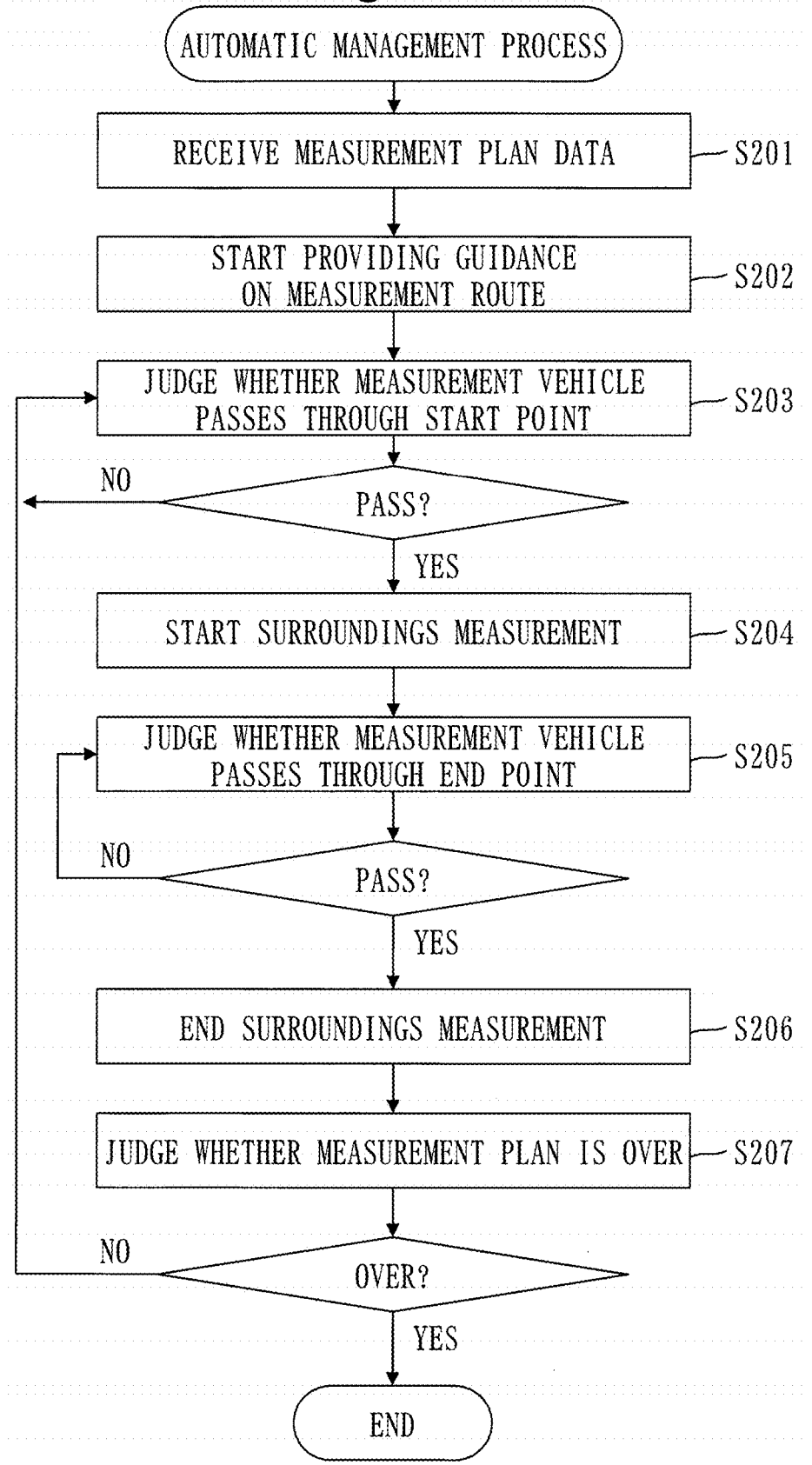
FIG. 14 is a flowchart of an automatic management process according to Embodiment 2.

An automatic management process will be described on the basis of FIG. 14.

The automatic management process is executed by the automatic management unit 240 of the vehicle-mounted management apparatus 200.

Before the automatic management process is started, satellite positioning is started.

Satellite positioning may be started by either a vehicle-mounted management unit 220 or a vehicle-mounted operation unit 230.

In step S201, the measurement plan acceptance unit 241 receives measurement plan data from the remote management apparatus 300.

The measurement plan data indicates a measurement route. The measurement route includes one or more measurement sections.

Figure 15:
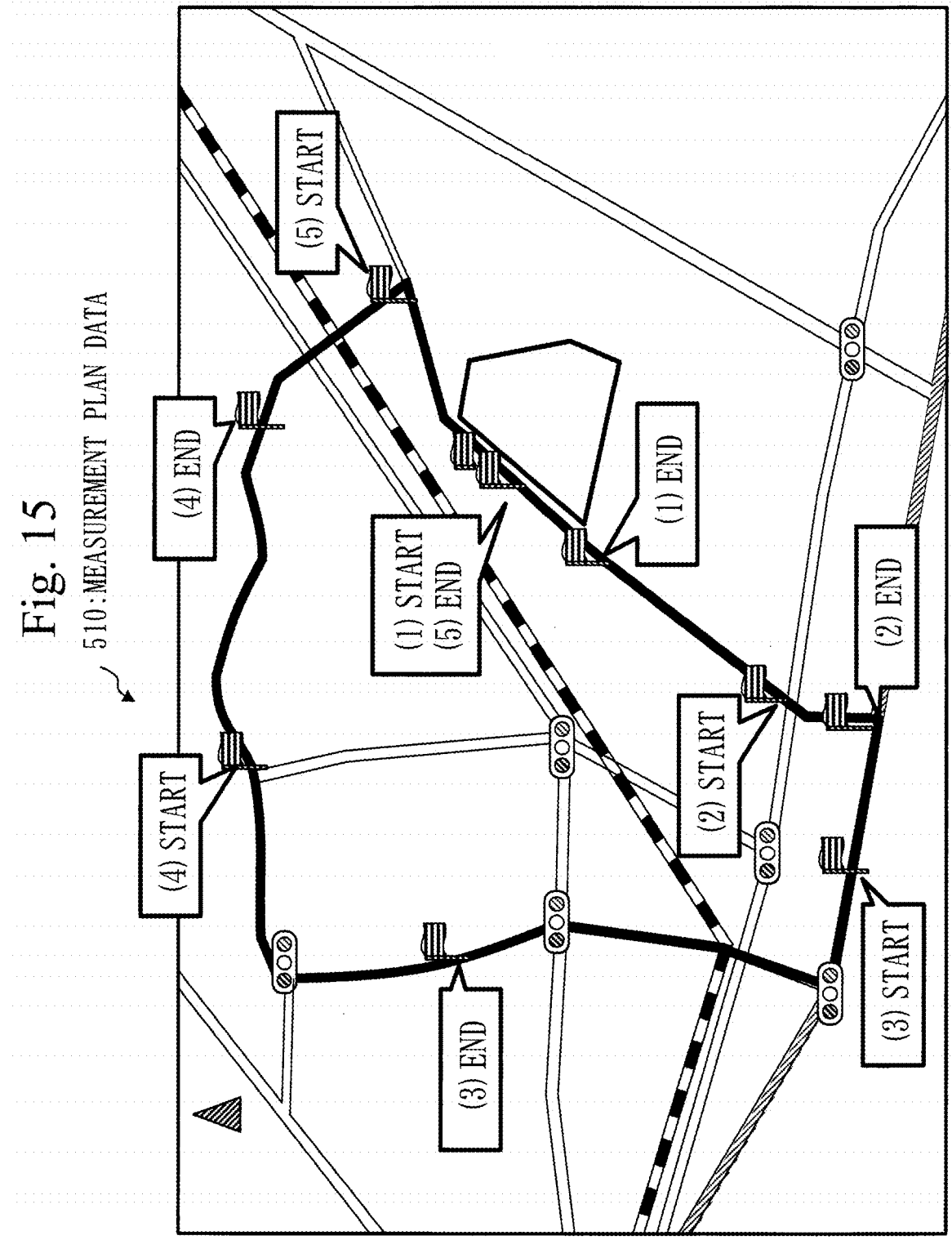
FIG. 15 is a view showing content of measurement plan data 510 according to Embodiment 2.

Content of measurement plan data 510 is shown in FIG. 15. The measurement plan data 510 is an example of the measurement plan data.

The measurement plan data 510 indicates a measurement route. Roads colored black are the measurement route.

The measurement route includes five measurement sections. A point marked with a flag is a start point or an end point of each measurement section.

Referring back to FIG. 14, a description will be continued from step S202.

In step S202, the navigation unit 242 starts providing guidance on the measurement route indicated by the received measurement plan data, using a car navigation system.

The car navigation system starts providing guidance on the measurement route, a driver drives the measurement vehicle 101 in accordance with the guidance, and the measurement vehicle 101 runs the measurement route.

In providing guidance on a measurement route, the navigation unit 242 displays a navigation screen on a display of the car navigation system.

The navigation screen is a screen for providing the guidance on the measurement route.

On the navigation screen, a part of the measurement route may be displayed or the whole of the measurement route may be displayed.

On the navigation screen, the measurement route may be displayed distinctively from roads other than the measurement route. For example, the measurement route is distinguished from roads other than the measurement route by a color, a pattern, or the like.

On the navigation screen, measurement sections may be displayed distinctively from each other. For example, each measurement section is distinguished by a color, a pattern, or the like.

On the navigation screen, each measurement section run by the measurement vehicle 101 and each measurement section not run by the measurement vehicle 101 may be displayed distinctively from each other. For example, each measurement section is distinguished by a color, a pattern, or the like.

In step S203, the automatic control unit 243 judges, on the basis of the measurement plan data and vehicle position data at each time, whether the measurement vehicle 101 passes through the start point of any measurement section.

Step S203 is repeatedly executed until the measurement vehicle 101 passes through the start point of any measurement section.

If the measurement vehicle 101 passes through the start point of any measurement section, the process advances to step S204. A measurement section starting at the start point, through which the measurement vehicle 101 passes, is referred to as a "target section".

In step S204, the automatic control unit 243 inputs a measurement start order to the measurement system instrument group 112. The measurement start order is an order for a start of surroundings measurement.

The measurement system instrument group 112 starts surroundings measurement in accordance with the measurement start order.

The automatic control unit 243 may output a starting sound using the car navigation system at the start of surroundings measurement. The starting sound is a sound for informing the driver of the start of surroundings measurement.

In step S205, the automatic control unit 243 judges, on the basis of the measurement plan data and vehicle position data at each time, whether the measurement vehicle 101 passes through the end point of the target section.

Step S205 is repeatedly executed until the measurement vehicle 101 passes through the end point of the target section.

If the measurement vehicle 101 passes through the end point of the target section, the process advances to step S206.

In step S206, the automatic control unit 243 inputs a measurement end order to the measurement system instrument group 112. The measurement end order is an order for an end of surroundings measurement.

The measurement system instrument group 112 ends surroundings measurement in accordance with the measurement end order.

The automatic control unit 243 may output an ending sound using the car navigation system at the end of surroundings measurement. The ending sound is a sound for informing the driver of the end of surroundings measurement.

In step S207, the automatic control unit 243 judges, on the basis of the measurement plan data, whether a measurement plan is over.

Specifically, the automatic control unit 243 judges whether the measurement vehicle 101 has run all measurement sections included in the measurement route. If the measurement vehicle 101 has run all the measurement sections included in the measurement route, the measurement plan ends.

If the measurement plan is not over, that is, if a measurement section remains without being run by the measurement vehicle 101, the process advances to step S203.

If the measurement plan is over, the automatic management process ends.

After the automatic management process ends, satellite positioning is ended.

Satellite positioning may be ended by either the vehicle-mounted management unit 220 or the vehicle-mounted operation unit 230.

Figure 16:
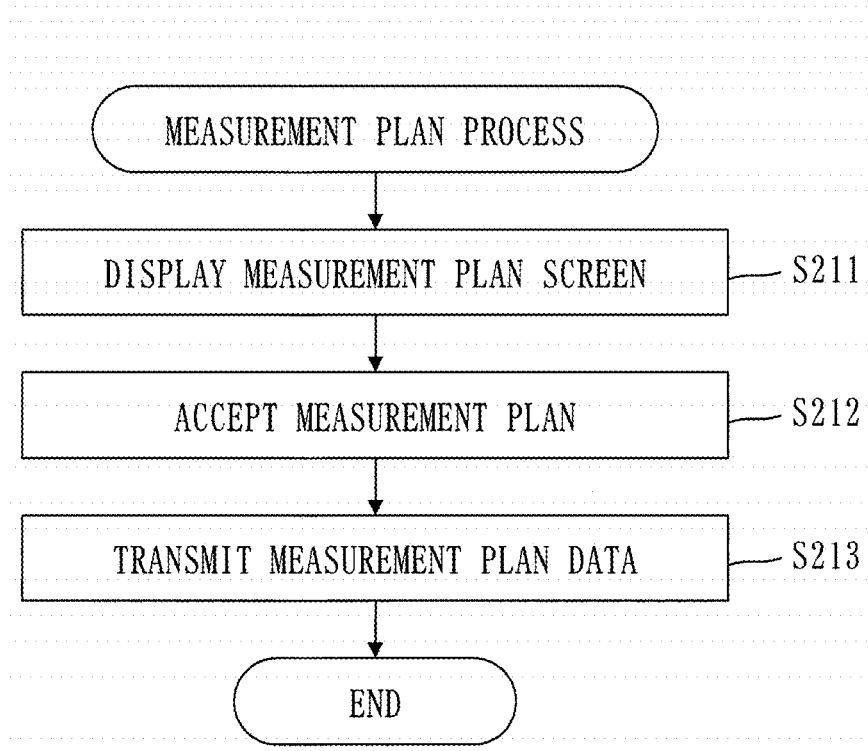
FIG. 16 is a flowchart of a measurement plan process according to Embodiment 2.

A measurement plan process will be described on the basis of FIG. 16.

The measurement plan process is executed by the measurement plan unit 320 of the remote management apparatus 300.

In step S211, the plan screen display unit 321 displays a measurement plan screen.

The measurement plan screen is displayed on a display which is connected to the remote management apparatus 300.

The measurement plan screen is a screen for designating a measurement route.

Specifically, a manager designates a region (target region) to serve as a target of measurement for the vehicle-mounted management apparatus 200. The plan screen display unit 321 generates a measurement plan screen indicating a map of the target region and displays the generated measurement plan screen.

In step S212, the manager designates a measurement route using the measurement plan screen.

The user plan acceptance unit 322 accepts designation of the measurement route via the measurement plan screen and generates measurement route data indicating the designated measurement route.

Figure 17:
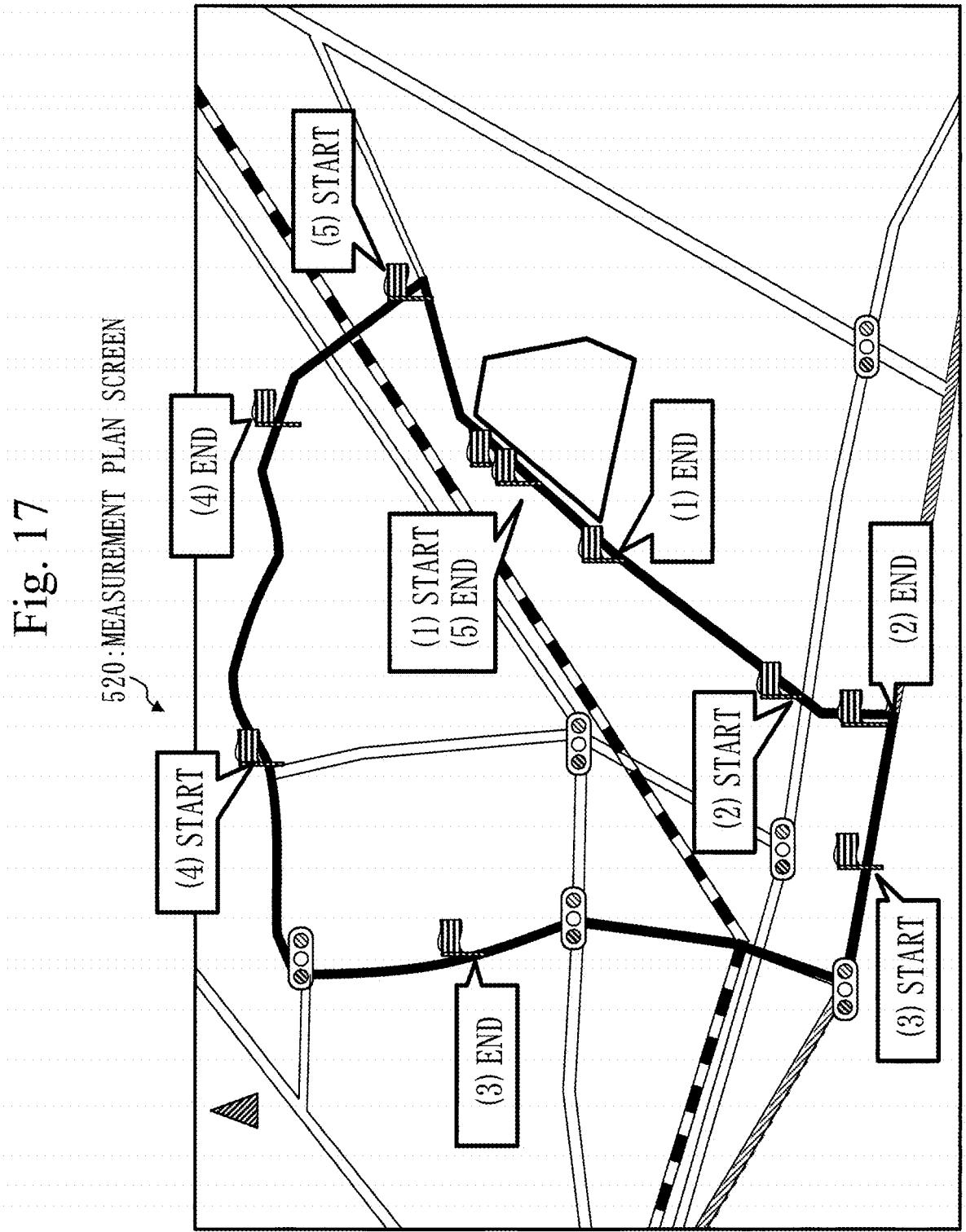
FIG. 17 is a view showing a measurement plan screen 520 according to Embodiment 2.

A measurement plan screen 520 is shown in FIG. 17. The measurement plan screen 520 is an example of the measurement plan screen.

The measurement plan screen 520 indicates a map of a target region and a measurement route. Roads colored black are the measurement route.

The measurement route includes five measurement sections. A point marked with a flag is a start point or an end point of each measurement section.

On the measurement plan screen 520, measurement sections may be displayed distinctively from each other. For example, each measurement section is distinguished by a color, a pattern, or the like.

For example, the manager designates a start point of the measurement route, an end point of the measurement route, the start points of the respective measurement sections, and the end points of the respective measurement sections by moving a cursor with a mouse and clicking with the mouse.

Referring back to FIG. 16, step S213 will be described.

In step S213, the measurement plan instruction unit 323 transmits measurement plan data to the vehicle-mounted management apparatus 200.

\*\*\*Advantageous Effects of Embodiment 2\*\*\*

Embodiment 2 allows the vehicle-mounted management apparatus 200 to automatically make a start of surroundings measurement and an end of surroundings measurement.

A driver may drive the measurement vehicle 101 in accordance with route guidance provided by the car navigation system.

\*\*\*Supplement to Embodiments\*\*\*

Figure 18:
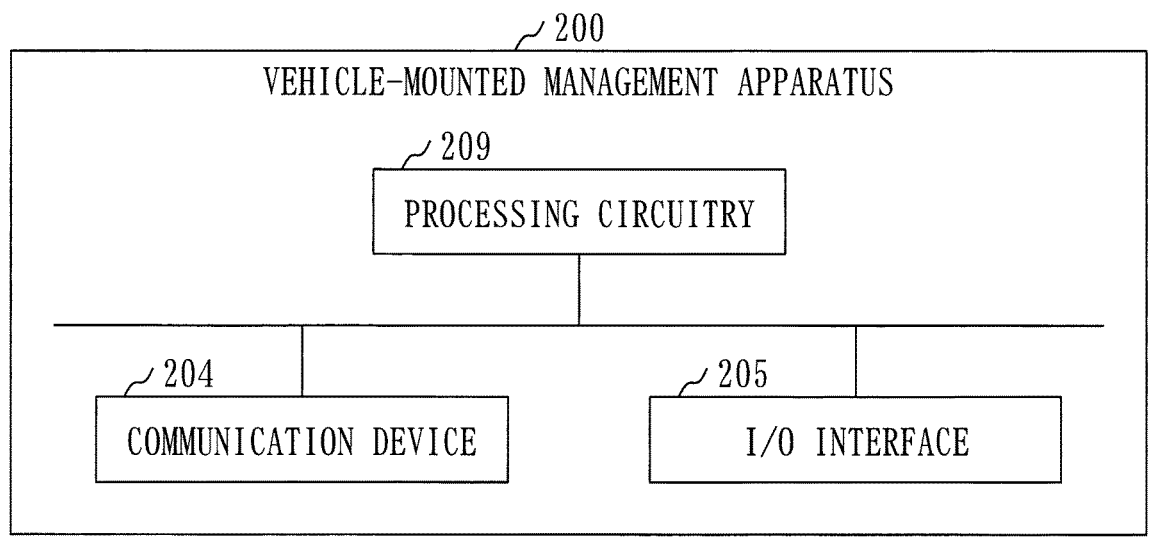
FIG. 18 is a diagram of a hardware configuration of the vehicle-mounted management apparatus 200 according to the embodiments.

A hardware configuration of the vehicle-mounted management apparatus 200 will be described on the basis of FIG. 18.

The vehicle-mounted management apparatus 200 includes processing circuitry 209.

The processing circuitry 209 is hardware which implements the measurement processing unit 210, the vehicle-mounted management unit 220, the vehicle-mounted operation unit 230, and the automatic management unit 240.

The processing circuitry 209 may be dedicated hardware or the processor 201 that executes a program stored in the memory 202.

If the processing circuitry 209 is dedicated hardware, the processing circuitry 209 is, for example, a single circuit, a composite circuit, a programmed processor, a parallel-programmed processor, an ASIC, an FPGA, or a combination thereof.

ASIC stands for Application Specific Integrated Circuit.
FPGA stands for Field Programmable Gate Array.

The vehicle-mounted management apparatus 200 may include a plurality of processing circuits which substitute for the processing circuitry 209. The plurality of processing circuits share functions of the processing circuitry 209.

In the processing circuit 209, some of the functions may be implemented by dedicated hardware, and the remaining functions may be implemented by software or firmware.

As described above, functions of the vehicle-mounted management apparatus 200 can be implemented by hardware, software, firmware, or a combination thereof.

Figure 19:
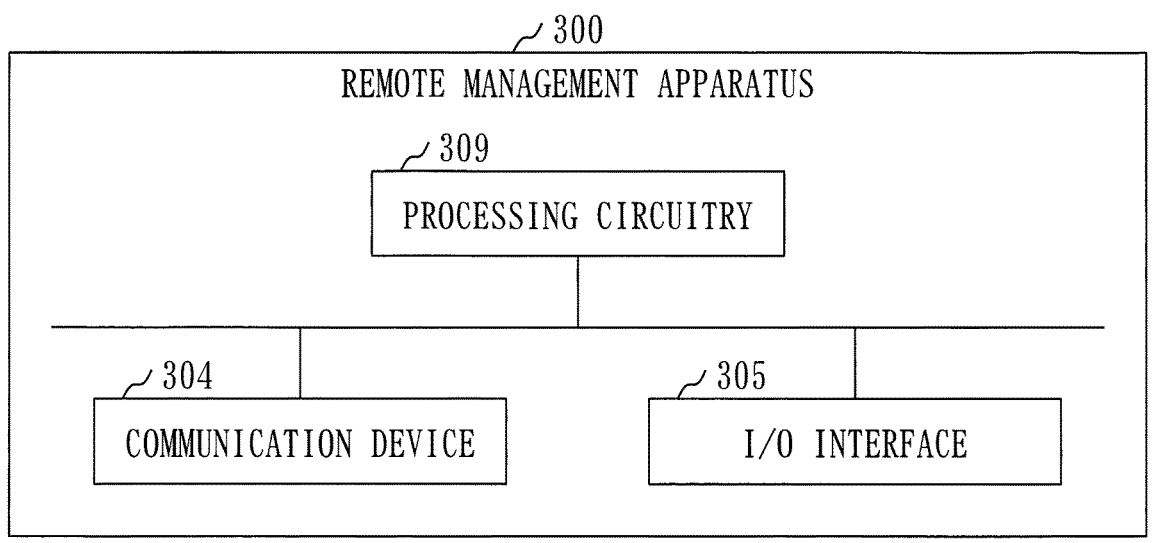
FIG. 19 is a diagram of a hardware configuration of the remote management apparatus 300 according to the embodiments.

A hardware configuration of the remote management apparatus 300 will be described on the basis of FIG. 19.

The remote management apparatus 300 includes a processing circuitry 309.

The processing circuitry 309 is hardware which implements the remote management unit 310 and the measurement plan unit 320.

The processing circuitry 309 may be dedicated hardware or the processor 301 that executes a program stored in the memory 302.

If the processing circuitry 309 is dedicated hardware, the processing circuitry 309 is, for example, a single circuit, a composite circuit, a programmed processor, a parallel-programmed processor, an ASIC, an FPGA, or a combination thereof.

The remote management apparatus 300 may include a plurality of processing circuits which substitute for the processing circuitry 309. The plurality of processing circuits share functions of the processing circuitry 309.

In the processing circuitry 309, some of the functions may be implemented by dedicated hardware, and the remaining functions may be implemented by software or firmware.

As described above, functions of the remote management apparatus 300 can be implemented by hardware, software, firmware, or a combination thereof.

The embodiments are illustrative of preferred forms and are not intended to limit the technical scope of the present invention. Each embodiment may be partly practiced or may be practiced in combination with another embodiment. A procedure described using a flowchart and the like may be appropriately changed.

Each of the vehicle-mounted management apparatus 200 and the remote management apparatus 300 may be implemented as a plurality of apparatuses.

"Unit" in each of the elements of the vehicle-mounted management apparatus 200 and the remote management apparatus 300 may be replaced with "process" or "step".

REFERENCE SIGNS LIST

100: remote management system; 101: measurement vehicle; 102: mobile router; 103: router; 104: base station; 109: network; 110: measurement system; 111: positioning system instrument group; 112: measurement system instrument group; 121: antenna; 122: camera; 123: laser scanner; 124: IMU; 200: vehicle-mounted management apparatus; 201: processor; 202: memory; 203: auxiliary storage device; 204: communication device; 205: I/O interface; 209: processing circuitry; 210: measurement processing unit; 220: vehicle-mounted management unit; 221: data notification unit; 222: remote instruction acceptance unit; 223: vehicle-mounted control unit; 224: information management unit; 230: vehicle-mounted operation unit; 240: automatic management unit; 241: measurement plan acceptance unit; 242: navigation unit; 243: automatic control unit; 290: storage unit; 300: remote management apparatus; 301: processor, 302: memory; 303: auxiliary storage device; 304: communication device; 305: I/O interface; 309: processing circuitry; 310: remote management unit; 311: data acceptance unit; 312: management screen display unit; 313: user instruction acceptance unit; 314: remote instruction unit; 320: measurement plan unit; 321: plan screen display unit; 322: user plan acceptance unit; 323: measurement plan instruction unit; 390: storage unit; 410: remote management screen; 411: vehicle information row; 412: vehicle position mark; 413: start button; 414: end button; 420: remote management screen; 421: status field; 422: positioning operation button; 423: measurement operation button; 424: image field; 425: positioning environment field; 426: log field; 430: remote management screen; 431: status field; 432: positioning operation button; 433: measurement operation button; 434: map field; 435: vehicle position mark; 440: remote management screen; 441: status field; 442: positioning operation button; 443: measurement operation button; 444: settings field; 490: vehicle-mounted management screen; 500: communication line; 510: measurement plan data; 520: measurement plan screen

The invention claimed is:
1. A measurement vehicle in which a measurement system for movement measurement is installed, the measurement vehicle comprising:
processing circuitry:
to manage movement measurement status data indicating a status of the movement measurement;
to acquire measurement environment data indicating a measurement environment from the measurement system and to transmit the acquired measurement environment data and the movement measurement status data to a base station, the base station being for displaying a remote management screen indicating various status information;
to receive movement measurement instruction data indicating an instruction on the movement measurement from the base station, for operating the movement measurement system while driving the measurement vehicle; and
to control the measurement system and change settings of the measurement system in accordance with the instruction indicated by the received movement measurement instruction data, wherein
the measurement environment data includes
vehicle position data indicating a position of the measurement vehicle,
instrument status data, the instrument status data being data indicating a status of each of one or more measurement instruments that are included in the measurement system and data including error-related information, and positioning condition data, the positioning condition data being data indicating a condition of satellite positioning that is a part of the movement measurement and data including information specifying whether the satellite positioning is possible, the movement measurement status data includes satellite positioning status data indicating whether the satellite positioning is in progress, and surroundings measurement status data indicating whether surroundings measurement that is a part of the movement measurement is in progress, and the processing circuitry is further to:

receive measurement plan data indicating a measurement route including one or more measurement sections from the base station, judge whether the measurement vehicle passes through a start point of any measurement section on the basis of the measurement plan data, making the measurement section a target measurement section, and activating a measurement start order to the measurement system instrument group in response to the measurement vehicle passing through the start point, judge whether the measurement vehicle passes through an end point of the target measurement section on the basis of the measurement plan data and vehicle position data and activating a measurement end order to the measurement system instrument group in response to the measurement vehicle passing through the end point, and controls the measurement system such that the satellite positioning is started before an automatic management process and an automatic control is started and ends after the automatic management process ends.

2. The measurement vehicle according to claim 1, wherein the measurement system has a positioning system instrument group that is a group of measurement instruments for the satellite positioning and a measurement system instrument group that is a group of measurement instruments for the surroundings measurement, the processing circuitry receives positioning start instruction data that is movement measurement instruction data indicating an instruction for a start of the satellite positioning, positioning end instruction data that is movement measurement instruction data indicating an instruction for an end of the satellite positioning, measurement start instruction data that is movement measurement instruction data indicating an instruction for a start of the surroundings measurement, and measurement end instruction data that is movement measurement instruction data indicating an instruction for an end of the surroundings measurement, inputs an order for the start of the satellite positioning to the positioning system instrument group if the positioning start instruction data is received, inputs an order for the end of the satellite positioning to the positioning system instrument group if the positioning end instruction data is received, inputs a measurement start order for the start of the surroundings measurement to the measurement system instrument group if the measurement start instruction data is received, and inputs the measurement end order for the end of the surroundings measurement to the measurement system instrument group if the measurement end instruction data is received.

3. The measurement vehicle according to claim 1, wherein:

the satellite positioning status data indicates a positioning ID which identifies the satellite positioning in progress and an elapsed time period of the satellite positioning in progress, and the surroundings measurement status data indicates a scene number which identifies the surroundings measurement in progress and an elapsed time period of the surroundings measurement in progress.

4. A base station comprising:

processing circuitry to:

to receive measurement environment data indicating a measurement environment from a measurement vehicle in which a measurement system for movement measurement is installed;

to display a remote management screen indicating the measurement environment on the basis of the received measurement environment data;

to accept an instruction on the movement measurement via a user interface that is included in the remote management screen;

to transmit movement measurement instruction data indicating the accepted instruction to the measurement vehicle;

to display a measurement plan screen for designation of a measurement route including one or more measurement sections;

to accept the designation of the measurement route, a start point of the one or more measurement sections and an end point of the one or more measurement sections on a map via a user interface that is included in the measurement plan screen; and to transmit measurement route data indicating an accepted instruction to the measurement vehicle, wherein the remote management screen has a plurality of vehicle information rows corresponding to a plurality of measurement vehicles and a vehicle position map indicating a position of any one of the measurement vehicles, and if any vehicle information row is selected from among the plurality of vehicle information rows, the processing circuitry displays a vehicle position map for the measurement vehicle corresponding to the selected vehicle information row on the remote management screen, wherein the satellite positioning is started before an automatic management process and an automatic control is started and ends after the automatic management process ends.

5. The base station according to claim 4, wherein the measurement vehicle includes processing circuitry to:

manage movement measurement status data indicating a status of the movement measurement, acquire the measurement environment data from the measurement system and to transmit the acquired measurement environment data and the movement measurement status data to the base station, receive the movement measurement instruction data from the base station, and control the measurement system in accordance with the instruction indicated by the movement measurement instruction data, the measurement environment data includes vehicle position data indicating a position of the measurement vehicle, instrument status data, the instrument status data being data indicating a status of each of one or more measurement instruments that are included in the measurement system and data including error-related information, and positioning condition data, the positioning condition data being data indicating a condition of satellite positioning that is a part of the movement measurement and data including information specifying whether the satellite positioning is possible, and the movement measurement status data includes satellite positioning status data indicating whether the satellite positioning is in progress, and surroundings measurement status data indicating whether surroundings measurement that is a part of the movement measurement is in progress.

6. The base station according to claim 5, wherein the measurement system has a measurement system instrument group that is a group of measurement instruments for the surroundings measurement, and the processing circuitry of the measurement vehicle receives measurement plan data indicating a measurement route including one or more measurement sections from the base station, inputs a measurement start order to the measurement system instrument group when the measurement vehicle passes through a start point of each of the measurement sections indicated by the measurement plan data and inputs a measurement end order to the measurement system instrument group when the measurement vehicle passes through an end point of each of the measurement sections indicated by the measurement plan data.

* * * * *